United States Patent
Miyata et al.

(10) Patent No.: US 8,907,950 B2
(45) Date of Patent: Dec. 9, 2014

(54) DRIVING SIMULATION APPARATUS, WIDE-ANGLE CAMERA VIDEO SIMULATION APPARATUS, AND IMAGE DEFORMING/COMPOSITING APPARATUS

(75) Inventors: Ryosuke Miyata, Kawasaki (JP); Takushi Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1021 days.

(21) Appl. No.: 12/568,841

(22) Filed: Sep. 29, 2009

(65) Prior Publication Data

US 2010/0136507 A1   Jun. 3, 2010

(30) Foreign Application Priority Data

Dec. 1, 2008 (JP) ................................. 2008-306768

(51) Int. Cl.
*G06T 15/10* (2011.01)
*G06T 15/20* (2011.01)
*G09G 5/00* (2006.01)
*G06K 9/32* (2006.01)
*G06K 9/36* (2006.01)
*G09B 9/04* (2006.01)
*G09B 9/05* (2006.01)

(52) U.S. Cl.
CPC ... *G09B 9/04* (2013.01); *G09B 9/05* (2013.01)
USPC .......... 345/427; 345/419; 345/426; 345/582; 382/285; 382/293

(58) Field of Classification Search
None
See application file for complete search history.

(56) References Cited

U.S. PATENT DOCUMENTS

| 4,371,343 | A | | 2/1983 | Paris et al. |
| 4,479,784 | A | | 10/1984 | Mallinson et al. |
| 6,034,691 | A | * | 3/2000 | Aono et al. .................... 345/582 |

(Continued)

FOREIGN PATENT DOCUMENTS

| DE | 10226917 A1 | 1/2004 |
| JP | 10-105734 | 4/1998 |
| JP | 2002-133439 | 5/2002 |
| JP | 2003-85586 | 3/2003 |

OTHER PUBLICATIONS

German Office Action issued Mar. 17, 2011 in corresponding German Patent Application 10 2009 041 431.2-55.

(Continued)

*Primary Examiner* — Tize Ma
(74) *Attorney, Agent, or Firm* — Staas & Halsey LLP

(57) ABSTRACT

A driving simulation apparatus includes an input unit that receives an input of an operation instruction, a vehicle simulation unit that calculates a position and an orientation of a vehicle in a virtual environment in real-time, a camera state calculation unit that calculates a viewpoint position and a viewing direction of a on-vehicle wide-angle camera based on the position and the orientation of the vehicle, and a wide-angle camera simulation unit. The wide-angle camera simulation unit includes an intermediate image rendering unit that generates multiple intermediate images by, for multiple intermediate projection planes that cover a given field of view from the on-vehicle wide-angle camera, performing perspective projection on the virtual environment from the viewpoint position and the viewing direction of the on-vehicle wide-angle camera, and a video rendering unit that generates a on-vehicle wide-angle camera video by deforming and compositing the intermediate images based on a parameter generated based on a lens characteristic of the on-vehicle wide-angle camera that has been recorded in advance.

8 Claims, 25 Drawing Sheets

(56) References Cited

U.S. PATENT DOCUMENTS

| | | | |
|---|---|---|---|
| 7,375,728 B2 * | 5/2008 | Donath et al. | 345/427 |
| 2003/0011535 A1 | 1/2003 | Kikuchi et al. | |
| 2009/0237396 A1 * | 9/2009 | Venezia et al. | 345/419 |

OTHER PUBLICATIONS

Japanese Office Action issued Aug. 30, 2012 in corresponding Japanese Patent Application No. 2008-306768.

* cited by examiner

Projection by wide-angle lens

DRIVING SIMULATION APPARATUS, WIDE-ANGLE CAMERA VIDEO SIMULATION APPARATUS, AND IMAGE DEFORMING/COMPOSITING APPARATUS

CROSS-REFERENCE TO RELATED APPLICATIONS

This application is based upon and claims the benefit of priority of the prior Japanese Patent Application No. JP2008-306768, filed on Dec. 1, 2008, the entire contents of which are incorporated herein by reference.

FIELD

The present invention relates to a wide-angle camera video simulation apparatus, an image deforming/compositing apparatus using the same, a driving simulation apparatus using the same, and a method and a program for realizing the same.

BACKGROUND

Conventionally, in driving video games and driving simulators, processing has been performed for generating video of a virtual environment from a viewpoint that is fixed at the coordinates of a vehicle. There is demand for such video to be updated in real-time in conformity with the operation of the vehicle in the virtual environment. In order for such video to be generated in real-time by computer graphics, hardware that can perform high-speed rendering by perspective projection is generally used.

In the field of computer graphics, a rendering method that uses texture mapping and is for generating highly realistic video in real-time with use of such hardware has been developed (e.g., see Japanese Laid-open Patent Publication No. hei10-105734).

SUMMARY

According to an aspect of the invention, a driving simulation apparatus includes: an input unit that receives an input of an operation instruction with respect to a vehicle in a virtual environment; a vehicle simulation unit that calculates a position and an orientation of the vehicle in the virtual environment in real-time in accordance with the input of the operation instruction; a camera state calculation unit that obtains a viewpoint position and a viewing direction of a on-vehicle wide-angle camera (vehicle-mounted wide-angle camera) based on the position and the orientation of the vehicle; and a wide-angle camera simulation unit.

The wide-angle camera simulation unit includes an intermediate image rendering unit that generates a plurality of intermediate images by, for a plurality of intermediate projection planes that cover a given field of view from the on-vehicle wide-angle camera, performing perspective projection on the virtual environment from both the viewpoint position and the viewing direction of the on-vehicle wide-angle camera that are calculated by the camera state calculation unit, and a video rendering unit that generates a on-vehicle wide-angle camera video by deforming and compositing the plurality of intermediate images based on a parameter relating to a lens characteristic of the on-vehicle wide-angle camera that has been recorded in advance.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
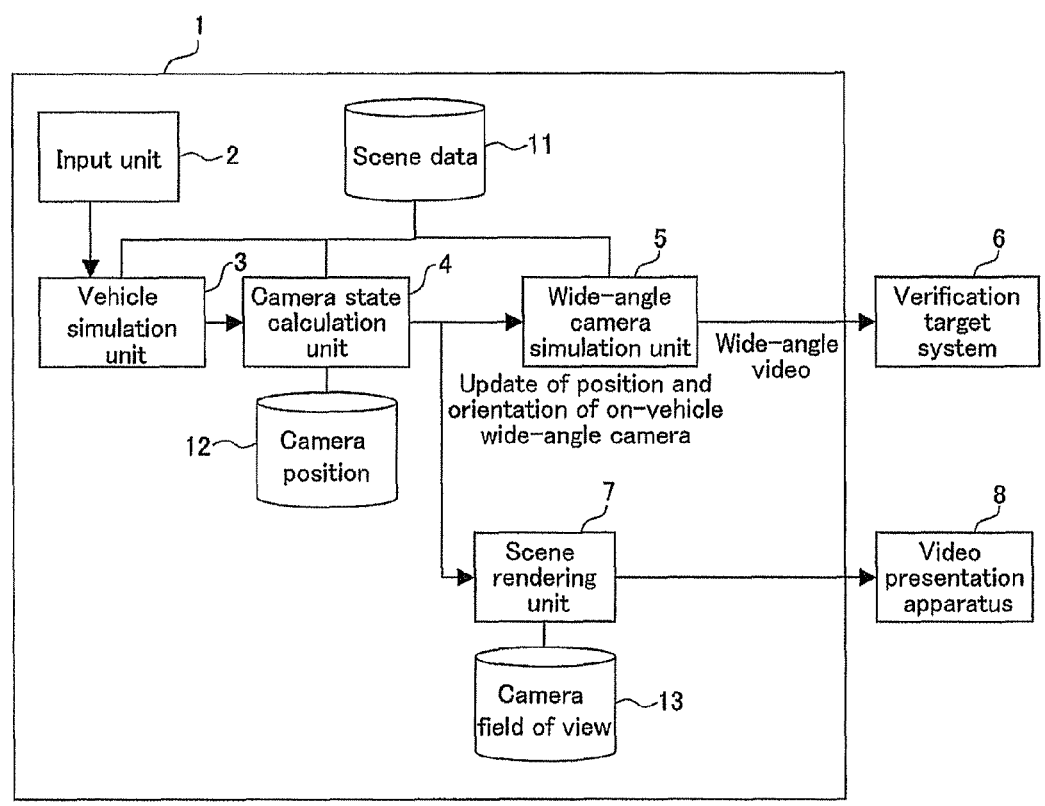
FIG. 1 is a functional block diagram illustrating an example of a configuration of a driving simulator according to Embodiment 1.

In conventional video generation systems, it has not been possible to simulate wide-angle camera video in which the angle of view is, for example, approximately 130 degrees or more in real-time. For example, in a CG video generation system in which a camera lens can be directly simulated, such as ray tracing, it is possible to generate wide-angle camera video, but such video cannot be generated in real-time since the processing load is too heavy.

Also, in a real-time CG video generation system that can generate video at a high speed using rendering-support hardware, video can be generated by perspective projection, but video having a wide angle of view cannot be generated by perspective projection. This is because calculation in perspective projection cannot in principle be performed if the angle of view is 180 degrees or more, and furthermore, as the angle of view approaches 180 degrees, the peripheral area of the field of view consumes the majority of the video area, and this is not practical. This is only practical up to an angle of view of approximately 120 degrees. Since video captured by an actual camera is distorted according to the lens characteristics and the like, proper simulation cannot be performed by a perspective projection method. In particular, the distortion is large in video captured with a camera using a wide-angle lens whose angle of view is close to 180 degrees, such as a fisheye lens, and in this case, video generated by perspective projection is largely different from actual images.

In a driving simulation apparatus of the embodiments described below, a viewpoint position and a viewing direction of an on-vehicle wide-angle camera are calculated based on the position and orientation of a vehicle calculated in real-time in accordance with an input of an operation instruction. Then, multiple intermediate images are generated by performing perspective projection for multiple intermediate projection planes from the viewpoint position and viewing direction of the on-vehicle wide-angle camera in the intermediate projection planes. These intermediate projection planes are set so that a given field of view is covered by combining the intermediate projection planes. Then, an on-vehicle wide-angle camera video can be generated by deforming and compositing the intermediate images based on parameters generated from the lens characteristics of the on-vehicle wide-angle camera. Accordingly, an on-vehicle wide-angle camera video is generated in two stages, namely processing for generating multiple intermediate images by performing perspective projection based on viewpoint positions and viewing directions of the on-vehicle wide-angle camera, and processing for deforming and compositing the intermediate images into video in accordance with parameters generated based on the lens characteristics. Both of these two stages of processing can be executed at a high speed by, for example, using dedicated hardware, therefore enabling generating real-time on-vehicle wide-angle camera video in correspondence with the position and orientation of a vehicle that have been calculated in real-time in accordance with an input of an operation instruction. As a result, it is possible to realize a driving simulation apparatus that can output on-vehicle wide-angle camera video in real-time in conformity with the operation of a vehicle.

In the embodiments of the present invention, the video rendering unit may generate the on-vehicle wide-angle camera video by generating, as the parameter, data expressing a correspondence relationship between the plurality of intermediate projection planes and a capturing plane of the on-vehicle wide-angle camera, and mapping textures of the plurality of intermediate images to the capturing plane with use of the data expressing the correspondence relationship.

According to this configuration, by performing texture mapping in accordance with the lens characteristic of the on-vehicle wide-angle camera, it is possible to generate an on-vehicle wide-angle camera video from multiple intermediate images.

In the embodiments of the present invention, the intermediate image rendering unit may cause hardware to execute processing in which the plurality of intermediate images are generated by performing perspective projection from the viewpoint position and the viewing direction of the on-vehicle wide-angle camera. The video rendering unit may cause the hardware to execute processing in which the on-vehicle wide-angle camera video is generated by deforming and compositing the plurality of intermediate images with use of the parameter obtained based on the lens characteristic of the on-vehicle wide-angle camera.

According to this configuration, it is possible to cause hardware to perform processing in which multiple intermediate images are generated, and processing in which an on-vehicle wide-angle camera video is generated from the intermediate images. This enables more generating an on-vehicle wide-angle camera video at a higher speed. Processing executed by hardware refers to processing executed by hardware dedicated to specific image data processing, not the CPU of a general-purpose computer. Examples of such hardware include a GPU (Graphics Processing unit, a VPU (Visual Processing Unit), a geometry engine, and another ASIC (Application Specific Integrated Circuit).

In the embodiments of the present invention, the intermediate image rendering unit may generate the plurality of intermediate images by performing perspective projection on the virtual environment from the viewpoint position and the viewing direction of the on-vehicle wide-angle camera, with use of, as the plurality of intermediate projection planes, at least two planes among six planes of a cube. In the cube, the viewpoint of the on-vehicle camera is included. The driving simulation apparatus may further include a direction vector attachment unit that calculates a direction vector for each node of a two-dimensional mesh arranged on a screen of the on-vehicle wide-angle camera video to be generated. The direction vector associates the node and a position on an intermediate projection plane from among the plurality of intermediate projection planes. The direction vector is calculated based on the parameter obtained based on the lens characteristic of the on-vehicle wide-angle camera. The video rendering unit may generate the on-vehicle wide-angle camera video by mapping textures of the plurality of intermediate images to the two-dimensional mesh with use of the direction vectors.

In the above configuration, the intermediate image rendering unit executes perspective projection with use of the planes of a cube including the viewpoint of the on-vehicle wide-angle camera as the intermediate projection planes. The video rendering unit maps the textures of the intermediate images obtained by performing perspective projection on the planes of the cube onto the two-dimension mesh in the screen of the on-vehicle wide-angle camera video, with use of the direction vectors calculated by the direction vector attachment unit based on the parameter relating to the lens characteristic of the on-vehicle wide-angle camera. According to this configuration, the video rendering unit can generate the on-vehicle wide-angle camera video with use of the cube mapping function. As a result, there is no need to perform setting so that the borders of the intermediate projection planes are not inside the polygons of the two-dimensional mesh in the screen of the on-vehicle wide-angle camera video. For this reason, there is increased freedom in the design of the two-dimensional mesh, and it is possible to simplify the image processing. Also, the two-dimensional mesh generation processing is simplified since, for example, there is also no need to update the two-dimensional mesh each time the parameter relating to the lens characteristic is updated.

In the embodiments of the present invention, the intermediate image rendering unit may generate the plurality of intermediate images by performing perspective projection on the virtual environment from the viewpoint position and the viewing direction of the on-vehicle wide-angle camera. As the plurality of intermediate projection planes, at least two planes among six planes of a cuboid in which the viewpoint of the on-vehicle camera is included are used. The driving simulation apparatus may further include a direction vector attachment unit and a vector conversion unit. The direction vector attachment unit calculates a direction vector for each node of a two-dimensional mesh arranged on a screen of the on-vehicle wide-angle camera video. The direction vector associates the node and a position on an intermediate projection plane from among the plurality of intermediate projection planes. The direction vector is calculated based on the parameter obtained based on the lens characteristic of the on-vehicle wide-angle camera. The vector conversion unit converts the direction vectors into vectors that, for each node of the two-dimensional mesh, associate the node and a position on a plane of a post-deformation cube obtained when the cuboid is deformed into a cube whose center is the camera viewpoint. This conversion is executed based on a positional relationship between the cuboid and the viewpoint of the on-vehicle wide-angle camera. The video rendering unit may generate the on-vehicle wide-angle camera video by mapping textures of the plurality of intermediate images to the two-dimensional mesh with use of the direction vectors.

According to the above configuration, the video rendering unit can generate the on-vehicle wide-angle camera video with use of the cube mapping function. Furthermore, the vector conversion unit converts direction vectors based on the positional relationship between the cuboid and the viewpoint, thereby enabling freely setting the positional relationship between the viewpoint of the on-vehicle wide-angle camera and the cuboid. As a result, it is possible to set the viewpoint position of the on-vehicle wide-angle camera with respect to the intermediate projection planes so that, for example, the cube mapping function can be used efficiently.

In the embodiments of the present invention, a cube mapping function may be used as processing in which the textures of the plurality of intermediate images are mapped to the two-dimensional mesh with use of the direction vectors. According to this configuration, it is possible to efficiently execute processing for mapping the textures of the intermediate images to the two-dimensional mesh with use of the direction vectors.

In the embodiments of the present invention, the driving simulation apparatus may further include a screen coordinate conversion unit that converts a screen coordinate in accordance with a video deformation pattern that has been recorded in advance.

According to this configuration, it is possible to simulate video from a camera that displays video deformed by performing processing on the captured signal, such as an on-vehicle wide-angle camera that includes a DSP (Digital Signal Processor).

In the embodiments of the present invention, partition lines of the two-dimensional mesh arranged on the screen of the on-vehicle wide-angle camera video to be generated may have been set so as to overlap with, among boundary lines of the plurality of intermediate projection planes, boundary lines that are to be straight lines on the screen of the on-vehicle wide-angle camera video to be generated. According to this configuration, it is possible to suppress texture distortion in the vicinity of the borders of the intermediate projection planes.

Another aspect of the present invention is a wide-angle camera video simulation apparatus including: a camera information input unit that receives an input of data expressing a viewpoint position and a viewing direction of a wide-angle camera in a virtual environment an intermediate image rendering unit that generates a plurality of intermediate images by, for a plurality of intermediate projection planes that cover a given field of view from the wide-angle camera, performing perspective projection on the virtual environment from the viewpoint position and the viewing direction of the wide-angle camera that have been input by the camera information input unit; and a video rendering unit that generates a wide-angle camera video by generating a parameter relating to deforming and compositing intermediate images based on a lens characteristic of the wide-angle camera that has been recorded in advance, and deforming and compositing the plurality of intermediate images.

According to the above configuration, multiple intermediate images are generated by performing perspective projection for multiple intermediate projection planes from the input viewpoint position and viewing direction of the wide-angle camera. These intermediate projection planes are set so that a given field of view is covered by combining the intermediate projection planes. Thereafter, it is possible to generate a wide-angle camera video by deforming and compositing the intermediate images based on the parameter relating to the lens characteristic of the wide-angle camera. Accordingly, a wide-angle camera video is generated in two stages of processing, namely processing in which intermediate images are generated by performing perspective projection from the viewpoint position and viewing direction of the wide-angle camera, and processing in which the intermediate images are deformed and composted into a video in accordance with the parameter relating to the lens characteristic. These two stages of processing are processing that can each be executed at a high speed by, for example, hardware, and therefore it is possible to generate a wide-angle camera video at a high speed. For example, if the position or orientation of the wide-angle camera in the virtual environment has changed, it is possible to update and output the wide-angle camera video in real-time.

Note that another aspect of the present invention is an image deforming/compositing apparatus incorporated in the wide-angle camera video simulation apparatus. Other aspects of the present invention are a program for causing a computer to function as the driving simulation apparatus, the wide-angle camera video simulation apparatus, or the image deforming/compositing apparatus, and a recording medium having the program recorded thereon. Still other aspects of the present invention are a driving simulation method, a wide-angle video simulation method, and an image deforming/compositing method realized by the computer.

According to the present invention, it is possible to provide a simulator that can output a wide-angle camera video in real-time in conformity with a simulation.

Embodiment 1

Embodiment 1 relates to a driving simulator that incorporates an image deforming/compositing apparatus that uses a computer. This driving simulator can be used in, for example, the verification of a driving view assistance system that uses an on-vehicle camera.

FIG. 1 is a functional block diagram illustrating an example of a configuration of the driving simulator according to Embodiment 1. A driving simulator 1 illustrated in FIG. 1 includes an input unit 2, a vehicle simulation unit 3, a camera state calculation unit 4, a wide-angle camera simulation unit 5, a scene rendering unit 7, a scene data recording unit 11, a camera position recording unit 12, and a camera field of view recording unit 13.

The input unit 2 is connected to input apparatuses such as a handle and a pedal, and the input unit 2 receives an input of handle operations and pedal operations performed by a user. The scene data recording unit 11 records data expressing a virtual environment (virtual space). The data expressing the virtual environment includes elements such as roads, traffic lights, cars, virtual drivers, buildings, backgrounds, lights, and cameras. The elements of the virtual environment are made up of model data and texture images for rendering, setting data for simulation calculation, state data expressing a current state in the virtual environment, and the like. The state data expresses, for example, the position and speed of an object in the virtual environment, the state of a car including an engine, transmission, suspension, and the like, the intent of a virtual driver and the state of operations performed by the virtual driver, and the position and orientation of cameras.

The vehicle simulation unit 3 receives input from the input unit 2 and an elapse of time, performs physical phenomenon simulation and virtual driver action simulation, and updates the scene data at, for example, a constant time interval. This updating results in the updating of for example, the position and orientation of a car expressed by the state data.

In particular, the vehicle simulation unit 3 executes simulation regarding the behavior of vehicles. For example, the vehicle simulation unit 3 updates the position and orientation of vehicles based on the input of driving operations from the input unit 2 and driving operations performed by virtual drivers.

As the vehicle simulation unit 3 updates the position and orientation of vehicles, the camera state calculation unit 4 updates the viewpoint and viewing direction of cameras with use of camera position information recorded in the camera position recording unit 12. For example, the camera state calculation unit 4 updates the position and orientation (e.g., the viewpoint and viewing direction) of a driver viewpoint camera, a camera following a car, and an on-vehicle wide-angle camera.

A camera position information in the camera position recording unit 12 is information expressing, for example, the position and orientation of cameras for each vehicle, and the positions and orientations are relative with respect to the vehicles. Information expressing updated camera positions and orientations (e.g., the viewpoint and viewing direction of a camera) is transmitted to the scene rendering unit 7 and the wide-angle camera simulation unit 5. For example, the viewpoint and viewing direction of the driver viewpoint camera and the camera following the car are transmitted to the scene rendering unit 7, and the viewpoint and viewing direction of the on-vehicle wide-angle camera is transmitted to the wide-angle camera simulation unit 5.

If there is more than one vehicle and on-vehicle wide-angle camera, one of them is selected for the one wide-angle camera simulation unit 5 as the target of rendering. Specifically, the camera selection may be set in advance, or may be switched by an operation (input via a switching button or the like) performed during execution. Note that more than one wide-angle camera simulation unit 5 may be provided in order to simulate multiple vehicles and multiple on-vehicle wide-angle cameras.

The scene rendering unit 7 visualizes conditions in the virtual environment based on updated scene data and camera positions and orientations, and camera field of view information recorded in the camera field of view recording unit 13. Field of view information is information expressing which range of a field of view is to be selected and rendered. The field of view information can also be said to be settings regarding the position and size (a positional relationship setting) of a projection plane (also called a perspective plane) with respect to a camera viewpoint position.

The scene rendering unit 7 executes processing for rendering a scene by performing perspective projection on model data in a scene, with respect to a projection plane set in the field of view information. Accordingly, the scene rendering unit 7 can generate video of a scene captured by a camera in real-time. The generated video is sent to an image presentation apparatus 8 such as a display or projector, and presented to the user.

As a result of the operation of the above function units, scene updating and rendering is repeatedly performed at a high speed (from several times per second to several tens of times per second) based on the input of driving operations via the input unit 2, and therefore time progresses in the virtual environment and moving images (video) are generated.

A driving simulator 1 is furthermore provided with the wide-angle camera simulation unit 5. The wide-angle camera simulation unit 5 receives, from the camera state calculation unit 4, data expressing the viewpoint and viewing direction of an on-vehicle wide-angle camera, generates video of the virtual environment as captured by the on-vehicle wide-angle camera, and outputs the video. The wide-angle camera simulation unit 5 outputs the video to a verification target system 6. The verification target system 6 is a system for performing, for example, verification of the driving view assistance system incorporated in a car navigation system.

The wide-angle camera simulation unit 5 may be provided as part of the scene rendering unit 7. In this case, the wide-angle camera simulation unit 5 outputs video to the video presentation apparatus 8, and the video presentation apparatus 8 displays the video captured by the wide-angle camera as well as, for example, video captured by the driver viewpoint camera and the camera following the car.

In order to generate a wide-angle camera video, the wide-angle camera simulation unit 5 generates multiple intermediate images by performing virtual environment perspective projection with respect to multiple intermediate projection planes from a single viewpoint position, and records the generated intermediate images into a buffer. The wide-angle camera simulation unit 5 then generates a video by deforming and compositing the intermediate images based on pre-recorded parameters expressing the lens characteristics of the wide-angle camera.

Example of Driving Simulator 1 Operations

Figure 2A:
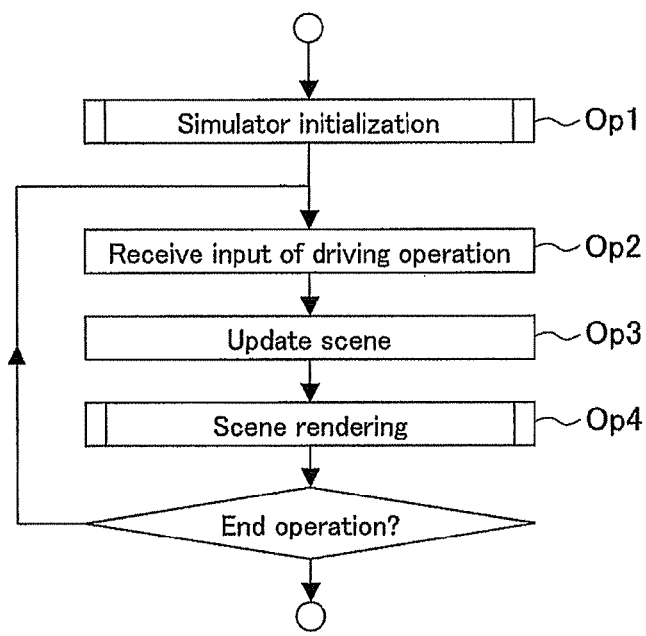
FIG. 2A is an operation chart illustrating an example of exemplary operations of a driving simulator 1.

FIG. 2A is an operation chart illustrating an example of operations performed by the driving simulator 1. The driving simulator 1 first executes initialization processing (Op1), and thereafter repeatedly performs scene updating (Op3) and scene rendering (Op4).

Figure 2B:
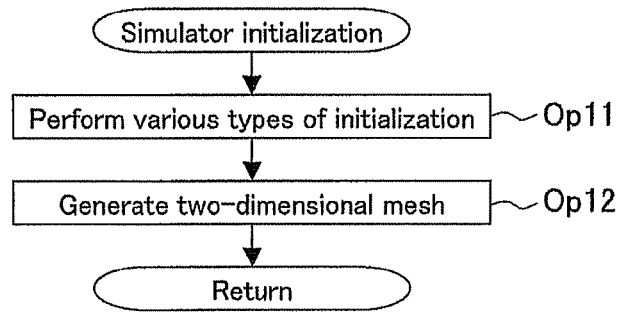
FIG. 2B is an operation chart illustrating an example of initialization processing performed by a wide-angle camera simulation unit.

FIG. 2B is an operation chart illustrating an example of initialization processing performed by the wide-angle camera simulation unit 5 in the initialization processing of Op1. In the example illustrated in FIG. 2B, the wide-angle camera simulation unit 5 initializes various parameters (Op11), and furthermore generates a two-dimensional mesh (Op12).

When the initialization processing of Op1 has ended, for example, the input unit 2 receives a vehicle driving operation from the user (Op2), and based on the input driving operation, the vehicle simulation unit 3 updates the position and orientation of a vehicle, and the camera state calculation unit 4 updates the viewpoint and viewing direction of a camera (Op3).

In the scene rendering of Op4, the scene rendering unit 7 and the wide-angle camera simulation unit 5 generate images captured from the camera viewpoint and viewing direction updated in Op3.

Figure 2C:
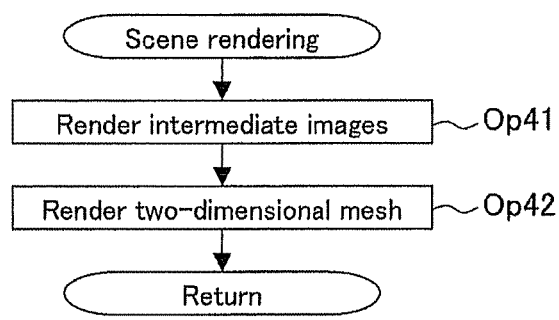
FIG. 2C illustrates an example of processing performed by the wide-angle camera simulation unit in scene rendering.

FIG. 2C illustrates an example of processing performed by the wide-angle camera simulation unit 5 in scene rendering (Op4). In the example illustrated in the FIG. 2C, the wide-angle camera simulation unit 5 generates video in two stages, namely a step of generating an intermediate image group by performing perspective projection for multiple intermediate projection planes (Op41), and a step of generating an output image by, for example, rendering a two-dimensional mesh with use of the intermediate image group (Op42).

As described above, in order for a wide-angle camera video to be generated, the driving simulator 1 executes processing in which the wide-angle camera simulation unit 5 generates a video by performing perspective projection multiple times from a single viewpoint position and compositing the results. This enables the real-time generation of wide-angle camera images. Note that details of the wide-angle camera simulation unit 5 are described below.

Details of Wide-Angle Camera Simulation Unit 5

Figure 3:
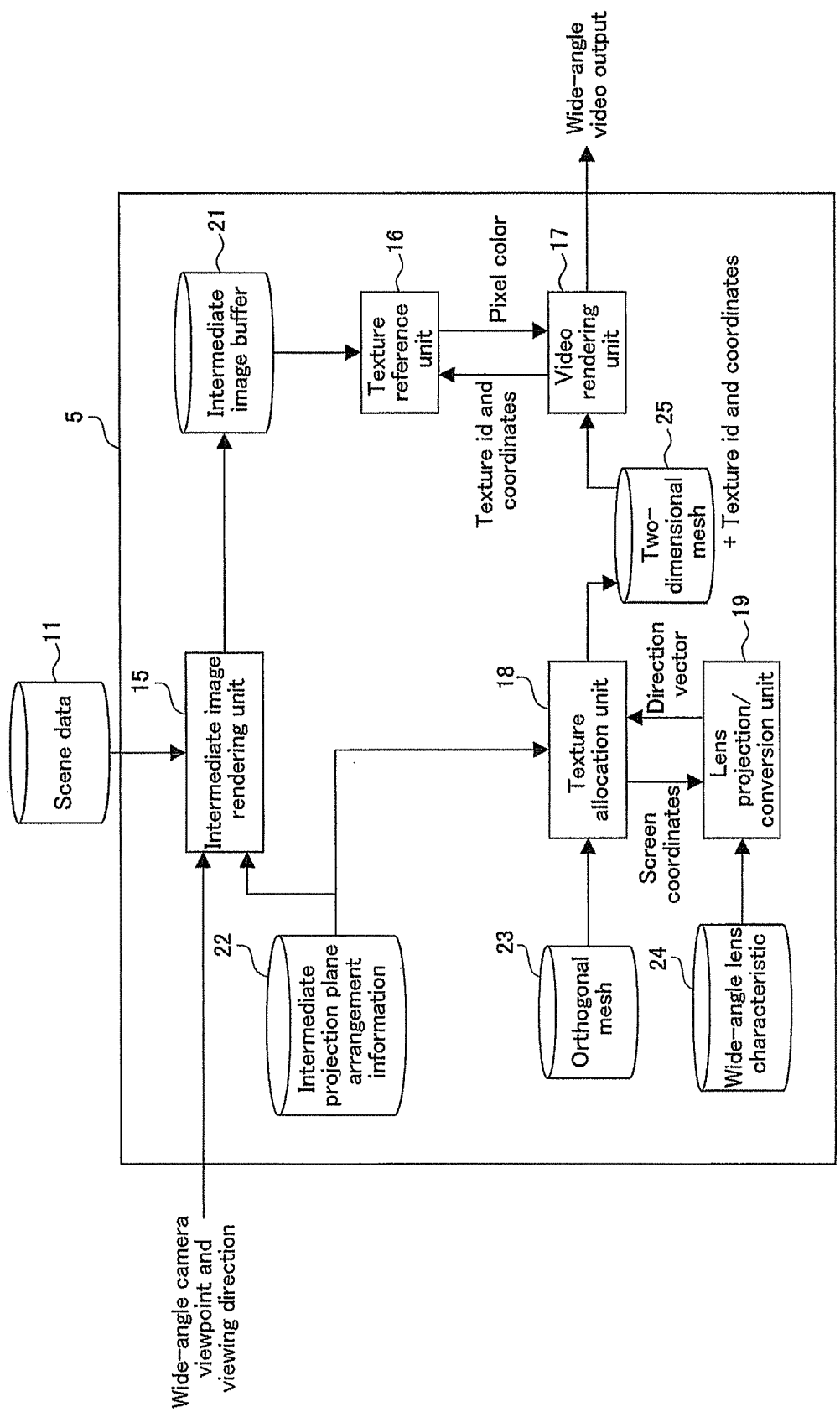
FIG. 3 is a functional block diagram illustrating an example of a configuration of the wide-angle camera simulation unit.

FIG. 3 is a functional block diagram illustrating a configuration of the wide-angle camera simulation unit 5. The wide-angle camera simulation unit 5 generates a video by generating intermediate images by partitioning a field of view into multiple angles of view of approximately 90 degrees and performing perspective projection for each, and then pasting and compositing the intermediate images onto a single two-dimensional mesh by texture mapping. The two-dimensional mesh is a plane that has been partitioned into multiple polygons with no space between. Points where partition lines (edges of polygons) intersect are called nodes. One node corresponds to the vertex of one or more polygons.

In the example illustrated in FIG. 3, the wide-angle camera simulation unit 5 includes an intermediate image rendering unit 15, a texture reference unit 16, a video rendering unit 17, a texture allocation unit 18, a lens projection/conversion unit 19, an intermediate image buffer 21, an intermediate projection plane arrangement information recording unit 22, an orthogonal mesh recording unit 23, a wide-angle lens characteristic recording unit 24, and a two-dimensional mesh recording unit 25.

The intermediate image rendering unit 15 generates multiple intermediate images by, for multiple intermediate projection planes, performing perspective projection on a virtual environment expressed by scene data from the viewpoint and viewing position of the wide-angle camera. The generated intermediate images are stored in the intermediate image buffer 21.

The intermediate projection plane arrangement information recording unit 22 has recorded therein data expressing a positional relationship between the viewpoint position of the wide-angle camera and the intermediate projection planes. The intermediate image rendering unit 15 references the data expressing the positional relationship between the viewpoint position of the wide-angle camera and the intermediate projection planes, and determines intermediate projection planes for which perspective projection is to be performed. Note that the data in the intermediate projection plane arrangement information recording unit 22 is set so that the intermediate projection planes cover a given field of view from the viewpoint of the wide-angle camera. The data in the intermediate projection plane arrangement information recording unit 22 is recorded therein in, for example, the initialization processing (Op1 described above) performed by the driving simulator 1.

Figure 4A:
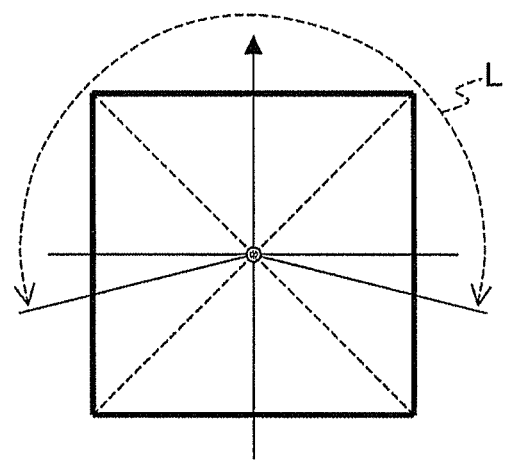
FIG. 4A is a diagram illustrating an example of a cubic projection plane arrangement as viewed from above.
Figure 4B:
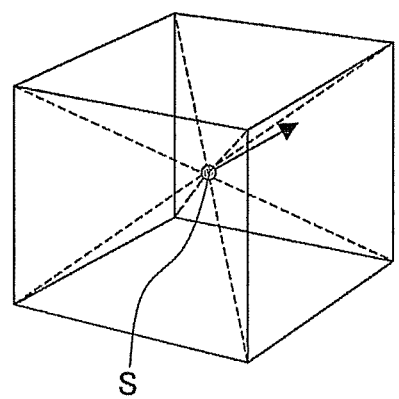
FIG. 4B is an example of a perspective view of the cubic projection plane arrangement.
Figure 5A:
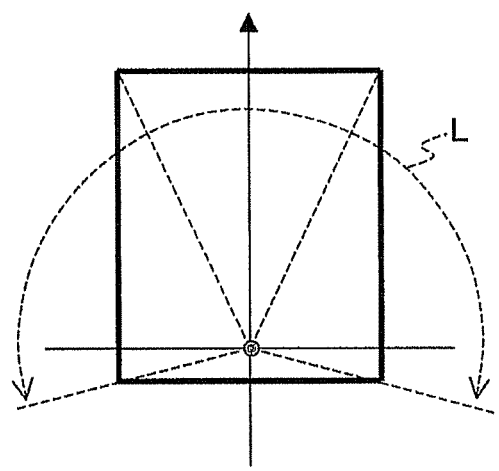
FIG. 5A is a diagram illustrating an example of a cuboid projection plane arrangement as viewed from above.
Figure 5B:
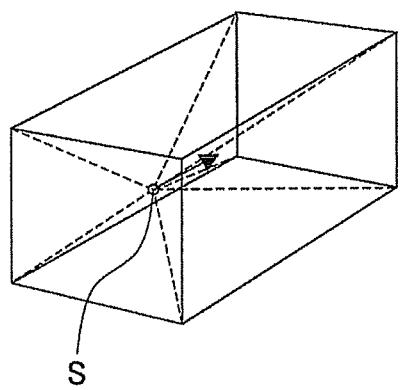
FIG. 5B is an example of a perspective view of the cuboid projection plane arrangement.
Figure 6A:
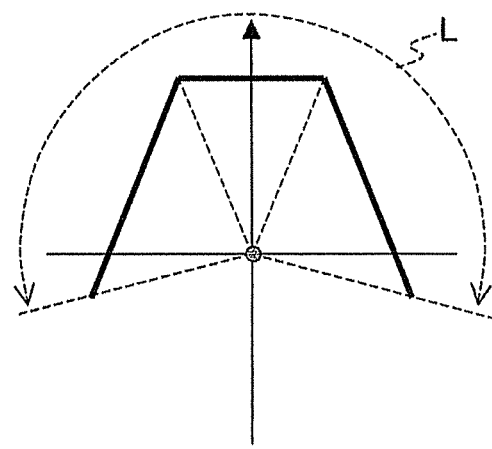
FIG. 6A is a diagram illustrating an example of a trapezoidal projection plane arrangement as viewed from above.
Figure 6B:
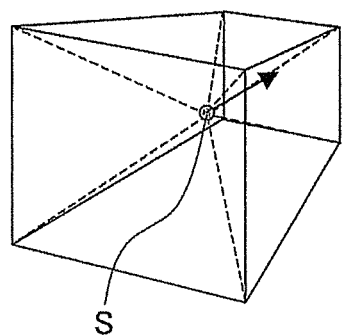
FIG. 6B is an example of a perspective view of the trapezoidal projection plane arrangement.

FIGS. 4A to 6B are diagrams illustrating examples of intermediate projection plane settings. FIGS. 4A, 5A, and 6A are diagrams illustrating a viewpoint position from above, and FIGS. 4B, 5B, and 6B are perspective diagrams. In the example illustrated in FIGS. 4A and 4B, the planes of a cube centered on the viewpoint position are set as the intermediate projection planes (cubic arrangement). In the example illustrated in FIGS. 5A and 5B, the planes of a cuboid including the viewpoint position are set as the intermediate projection planes (cuboid arrangement). In the example illustrated in FIGS. 6A and 6B, the planes of a six-sided object, the four lateral sides of which are trapezoidal, are set as the intermediate projection planes (trapezoidal arrangement). In FIGS. 4A, 5A, and 6A, L illustrates the field of view angle of the wide-angle lens. In FIGS. 4B, 5B, and 6B, S illustrates the viewpoint position of the wide-angle camera, and the arrow extending from the viewpoint position S illustrates the viewing direction.

Figure 7:
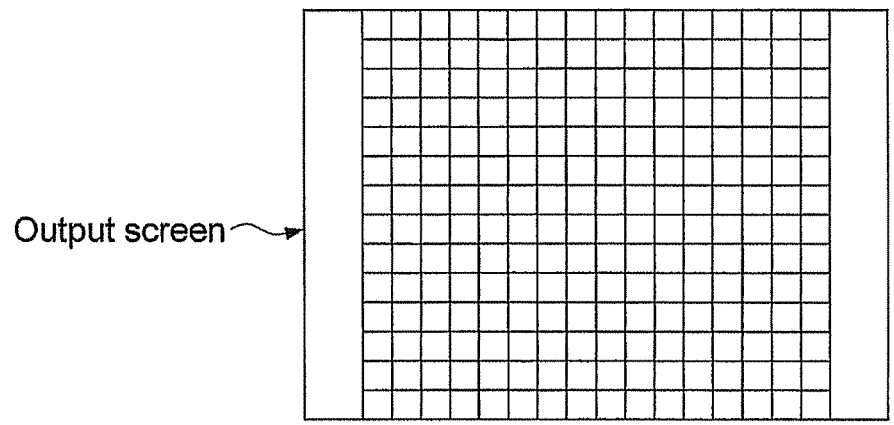
FIG. 7 is a diagram illustrating an example of an orthogonal mesh in an output screen of a wide-angle camera video.

In the initialization processing (Op1) performed by the driving simulator 1, the texture allocation unit 18 generates data that associates positions on intermediate images with a two-dimensional mesh of an image in the output video, and records the data in the two-dimensional mesh recording unit 25. For example, the texture allocation unit 18 calculates the texture ID and coordinates of intermediate projection planes corresponding to nodes in an orthogonal mesh recorded in advance in the orthogonal mesh recording unit 23. In this case, the two-dimensional mesh recording unit 25 has recorded therein the nodes of the orthogonal mesh in association with the texture IDs and coordinates of intermediate projection planes. FIG. 7 is a diagram illustrating an example of an orthogonal mesh in an output screen of a wide-angle camera video. In this example, FIG. 7 illustrates a two-dimensional mesh created in a grid configuration in an output screen.

Note that in the case of associating the nodes of the two-dimensional mesh and the texture IDs and coordinates of the intermediate projection planes, the texture allocation unit 18 transmits the screen coordinates of the nodes of the two-dimensional mesh to the lens projection/conversion unit 19. The lens projection/conversion unit 19 converts the screen coordinates into direction vectors based on the lens characteristic data recorded in the wide-angle lens characteristic recording unit 24, and transmits the direction vectors to the texture allocation unit 18 in response. Thereafter, the texture allocation unit 18 calculates the intermediate projection planes (the texture IDs thereof) that intersect the direction vectors, and coordinates in those projection planes.

In the above example, the lens projection/conversion unit 19 associates the screen coordinates and the direction vectors. Thereafter, the texture allocation unit 18 executes geometric calculation to associate the direction vectors and the intermediate projection planes, and allocates textures. Here, the lens characteristic data is data expressing a relationship between an image formed by a lens and an actual image, such as later-described data expressing the distortion characteristic of a lens image.

The video rendering unit 17 transmits the texture IDs and coordinates of the nodes of polygons in the orthogonal mesh recorded in the two-dimensional mesh recording unit 25 to the texture reference unit 16, and receives color information regarding the polygons. The texture reference unit 16 is a function unit that transmits data expressing a texture in an intermediate image expressed by an input text ID and coordinates in response. Executing this processing for all polygons in the orthogonal mesh obtains color information for the entire output image. In this way, a wide-angle camera video is generated.

Hardware Configuration

The driving simulator 1 can be constructed by installing a given program in a general-purpose computer such as a personal computer or workstation. Also, the present invention can be embodied as a program for causing the computer to function as the driving simulator 1 or the wide-angle camera simulation unit 5, and a recording medium having the program recorded thereon.

Figure 8:
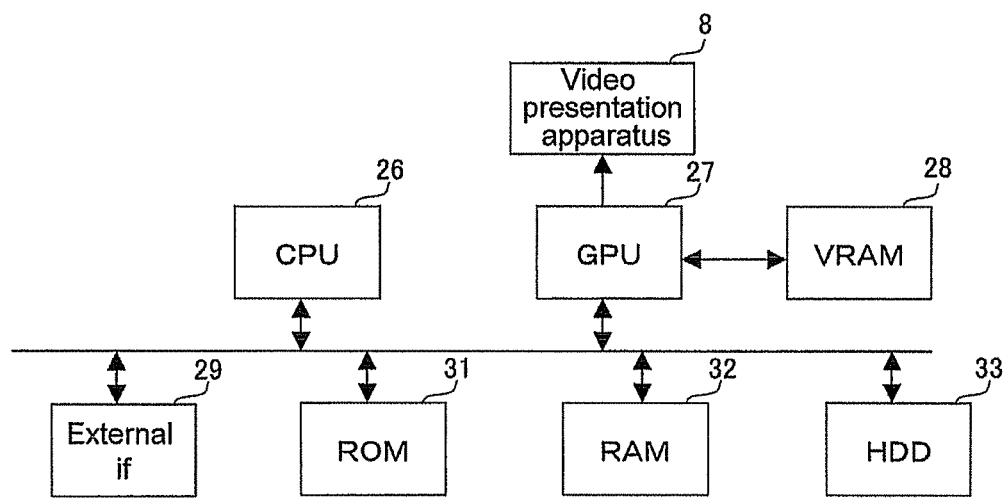
FIG. 8 is a diagram illustrating an example of a hardware configuration of a computer.

FIG. 8 is a diagram illustrating an example of a hardware configuration of a computer that can function as the driving simulator 1. In the example illustrated in FIG. 8, a CPU 26, a GPU 27, an external interface (external n) 29, a ROM 31, a RAM 32, and an HDD 33 are connected via a bus. The GPU 27 is connected to the video presentation apparatus 8 and a VRAM 28. The external IF 29 is an interface for the input and output of data with devices outside the computer. The external IF 29 is connected to peripheral devices such as a mouse, a keyboard, and an external recording apparatus.

The functions of the input unit 2, the vehicle simulation unit 3, the camera state calculation unit 4, the wide-angle camera simulation unit 5, and the scene rendering unit 7 are realized by the execution of given processing by the CPU 26 or the GPU 27. For example, the processing performed by the intermediate image rendering unit 15 and the video rendering unit 17 in the wide-angle camera simulation unit 5 can be executed more quickly by a GPU than a CPU. Note that the hardware configuration is not limited to the example illustrated in FIG. 8.

Embodiment 2

Embodiment 2 is an exemplary variation of the wide-angle camera simulation unit. The wide-angle camera simulation unit according to the present embodiment generates a wide-angle camera video with use of a cube mapping function.

The cube mapping function is a special texture mapping function that is performed with use of multiple texture images. For example, normally functions are provided by existing real-time CG software libraries and rendering-support hardware compatible with such libraries.

Figure 9:
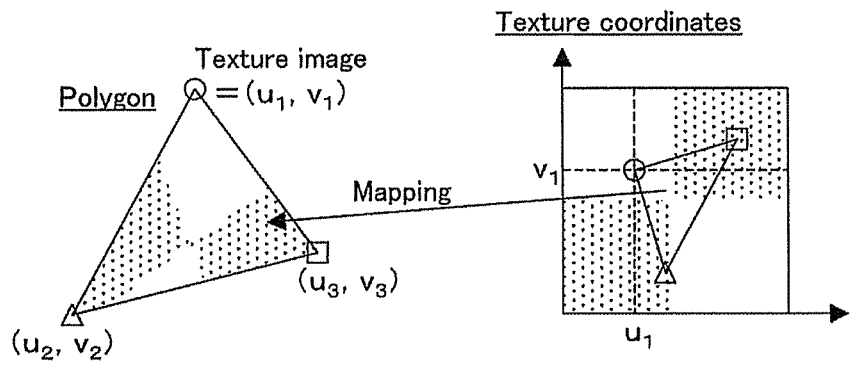
FIG. 9 is an example of a diagram for describing texture mapping.

FIG. 9 is a diagram for describing ordinary texture mapping. As illustrated in FIG. 9, in texture mapping, a texture in a texture image is referenced in accordance with texture coordinates $(u_1, v_1)$ $(u_2, v_2)$ $(u_3, v_3)$ assigned to polygon vertices denoted by a circle, a triangle, and a square respectively, and the referenced texture is pasted onto the polygon.

Figure 10:
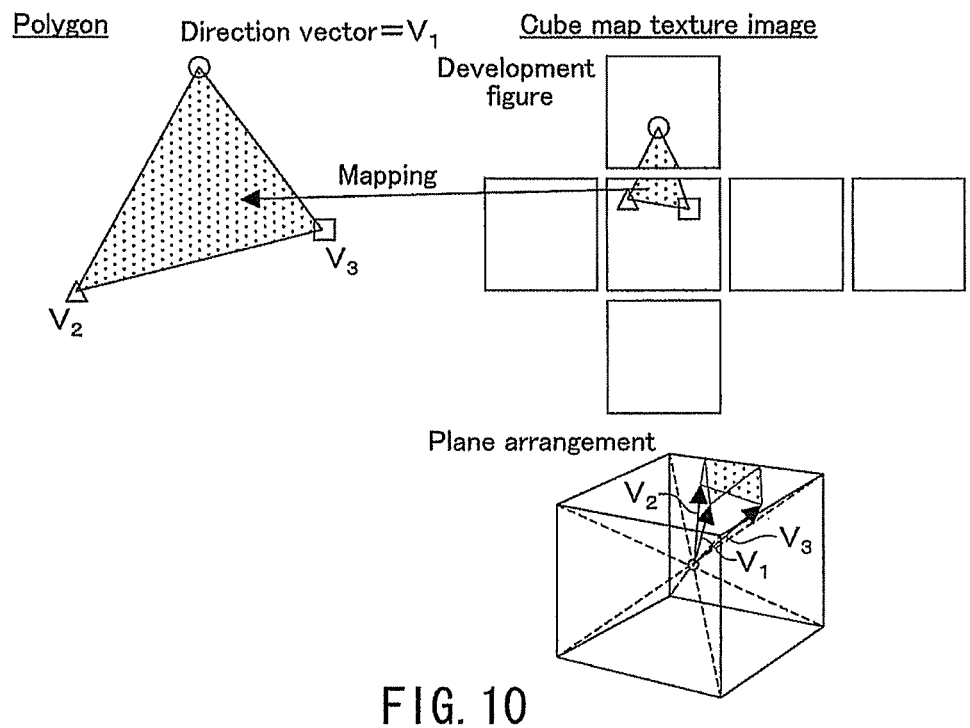
FIG. 10 is an example of a diagram for describing texture mapping in which a cube mapping function is used.

FIG. 10 is a diagram for describing texture mapping with use of the cube mapping function. As illustrated in FIG. 10, in cube mapping, a cube map texture is referenced in accordance with direction vectors V1, V2, and V3 assigned to polygon vertices denoted by a circle, a triangle, and a square respectively, and the referenced cube map texture is pasted onto the polygon. A cube map texture is a texture image composed of six texture images, each of which is the plane of a cube. A calculation (intersection calculation) is performed to obtain which position on which plane of a cube is pointed to by a direction vector extending from the center of the cube, and the image at that position in the texture image corresponding to that plane is pasted onto the polygon (texture referencing). Even inside a polygon, direction vectors are interpolated and used in referencing a cube map texture. If a polygon spans multiple planes (the direction vectors of the vertices point to different planes), different portions of the polygon interior are filled with different texture images.

Note that in the cube mapping function, a conventional stereoscopic mesh (and normal vectors thereof) have been used. In contrast, in the present embodiment, the provision of a direction vector calculation unit enables the use of nodes of a two-dimensional mesh of an output image to which direction vectors derived from lens characteristic data have been assigned.

Figure 11:
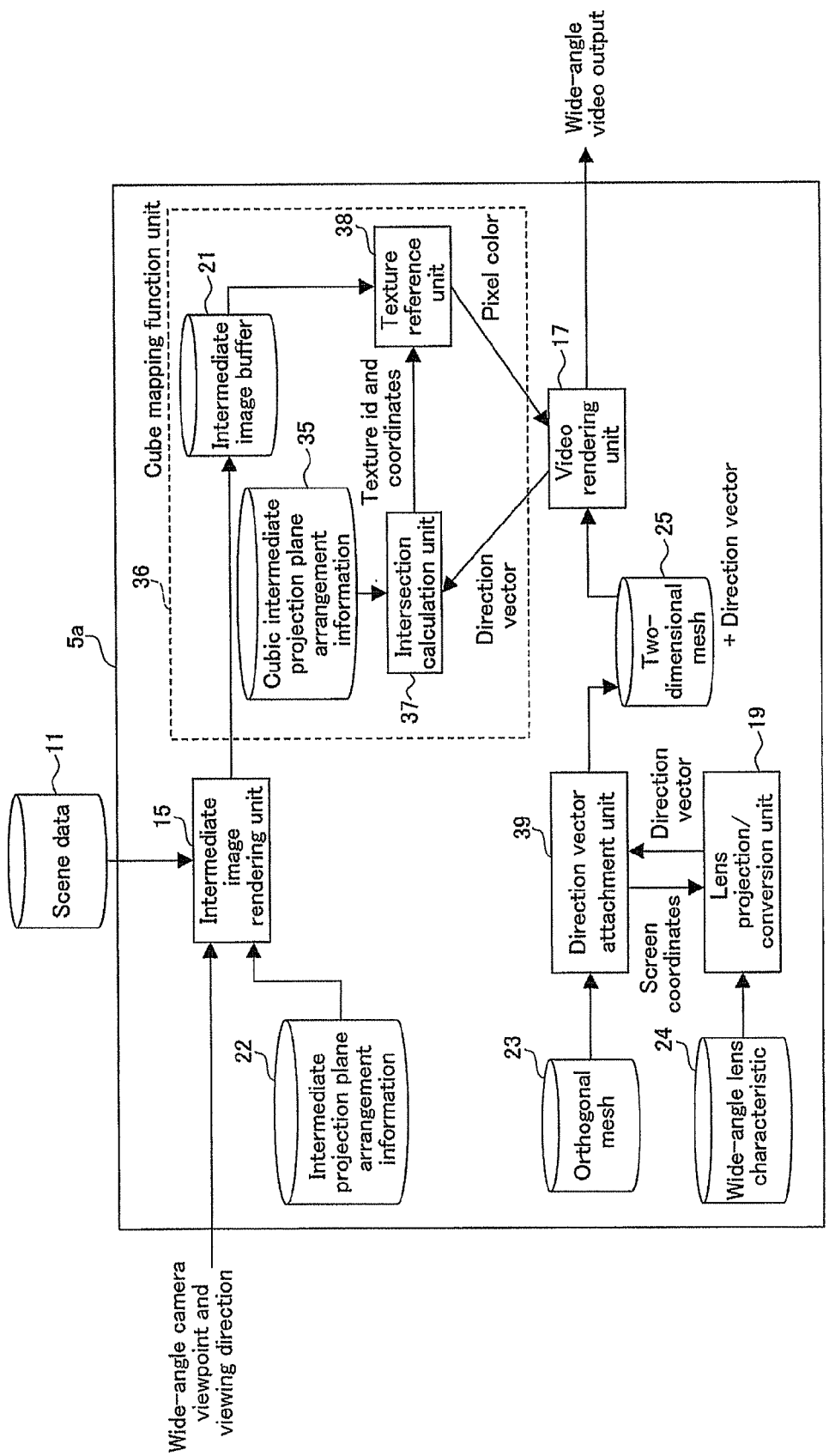
FIG. 11 is a functional block diagram illustrating an example of a configuration of a wide-angle camera simulation unit according to Embodiment 2.

FIG. 11 is a functional block diagram illustrating an example of a configuration of a wide-angle camera simulation unit 5*a* according to Embodiment 2. In FIG. 11, the same reference characters have been assigned to functional blocks that are the same as in FIG. 3. In the wide-angle camera simulation unit 5*a* illustrated in FIG. 11, the intermediate projection plane arrangement information recording unit 22 has recorded therein data expressing the cubic intermediate image arrangement illustrated in FIGS. 4A and 4B. The wide-angle camera simulation unit 5*a* includes a cube mapping function unit 36 and a direction vector attachment unit 39.

The cube mapping function unit 36 receives a polygon direction vector, and transmits pixel color information of a corresponding cube texture in response. The cube mapping function unit 36 includes an intersection calculation unit 37 that, upon receiving a direction vector, calculates what position on which plane of a cube is pointed to by the direction vector originating from the center of the cube, and a texture reference unit 38 that receives coordinates expressing the position on the plane of the cube, extracts a texture corresponding to the coordinates from the intermediate image buffer 21, and outputs the extracted texture. Note that the functions of the intersection calculation unit 37 and the texture reference unit 38 in the cube mapping function unit 36 can be realized by dedicated hardware such as a GPU.

Cubic intermediate projection plane arrangement information 35 includes data expressing the arrangement of intermediate projection planes. As one example, the cubic intermediate projection plane arrangement information 35 includes data expressing the fact that the six planes of a cube centered around the viewpoint are the intermediate projection planes. Based on such data, the intersection calculation unit 37 can calculate positions on the intermediate projection planes that correspond to direction vectors.

Figure 12:
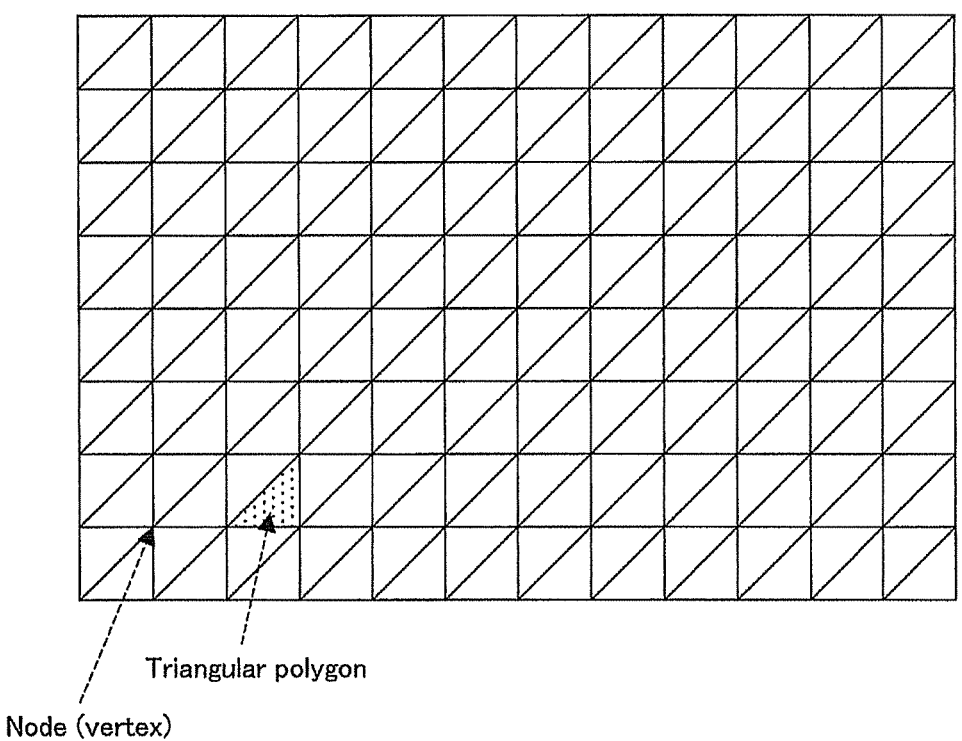
FIG. 12 is a diagram illustrating an example of a two-dimensional mesh in an output screen.

Also, the wide-angle camera simulation unit 5a generates a two-dimensional mesh in an output screen at the time of initialization performed by the driving simulator 1 (Op12 in FIG. 2B). The two-dimensional mesh is an arrangement of polygons that entirely fill up the output screen, and there are no limitations on the configuration. In the present embodiment, as one example illustrated in FIG. 12, the polygons are triangles obtained by partitioning the screen into a grid, and furthermore portioning each grid into halves. This two-dimensional mesh is recorded in the orthogonal mesh recording unit 23.

The direction vector attachment unit 39 calculates direction vectors that associate the nodes in the two-dimensional mesh and positions on the intermediate projection planes of the cube centered around the viewpoint, based on parameters relating to the lens characteristics of the wide-angle camera. The parameters relating to the lens characteristics of the wide-angle camera are recorded in advance in the wide-angle lens characteristic recording unit 24. Details of the direction vector calculation processing performed by the direction vector attachment unit 39 are described later.

The direction vectors calculated for each node of the two-dimensional mesh are recorded in the two-dimensional mesh recording unit 25 in association with the corresponding node. The video rendering unit 17 transmits the direction vectors corresponding to the nodes of the polygons in the two-dimensional mesh to the cube mapping function unit 36, and acquires textures for the polygons from the cube mapping function unit 36. An output image is generated when textures have been acquired for all of the polygons of the two-dimensional mesh.

Direction Vector Attachment

Figure 13A:
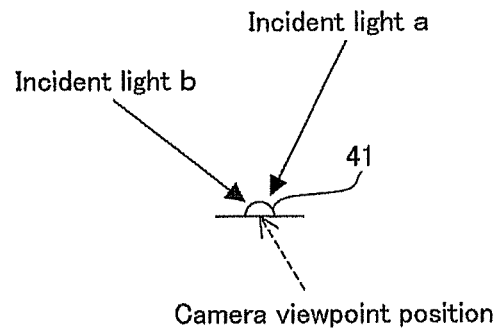
FIG. 13A is a diagram illustrating an example of a relationship between a wide-angle lens and incident light.
Figure 13B:
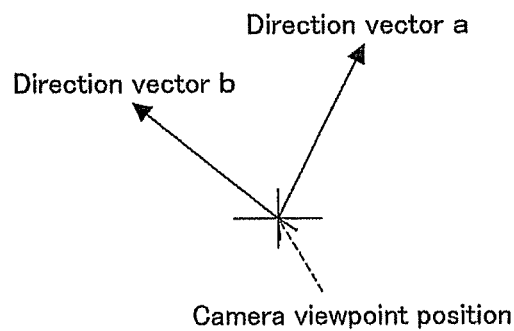
FIG. 13B is a diagram illustrating an example of direction vectors corresponding to incident light.
Figure 13C:
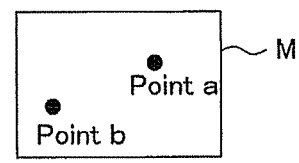
FIG. 13C is a diagram illustrating an example of positions of images formed on a video screen by incident light.

The following describes a specific example of direction vector calculation performed by the direction vector attachment unit 39. The direction vector attachment unit 39 assigns a direction vector to each node (polygon vertex) in a two-dimensional mesh. Here, as illustrated in FIG. 13A, incident light a and incident light b are assumed to have incidented on a wide-angle lens 41. Direction vectors a and b corresponding to the incident light a and b can be expressed by inverse vectors of the incident light a and b as illustrated in FIG. 13B. FIG. 13C illustrates points a and b resulting from the incident light a and b forming an image on a video screen. In this way, light incidenting on the lens from a certain direction forms an image at a certain point on a video plane. At this time, in consideration of the direction vector whose direction is opposite that of the incident light, it can also be said that the color of a point on a video plane M is the color pointed to by the corresponding direction vector.

Figure 14A:
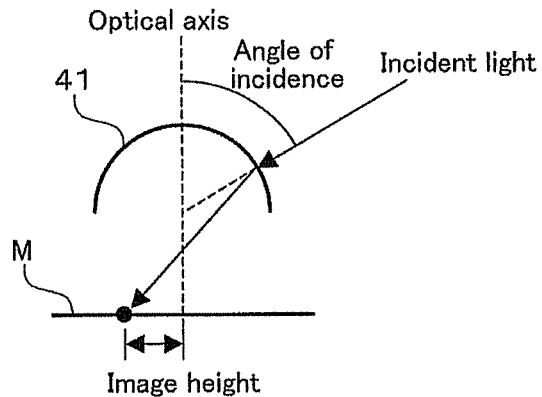
FIG. 14A is a diagram illustrating an example of a relationship between incident light, a wide-angle lens 41, and image height.
Figure 14B:
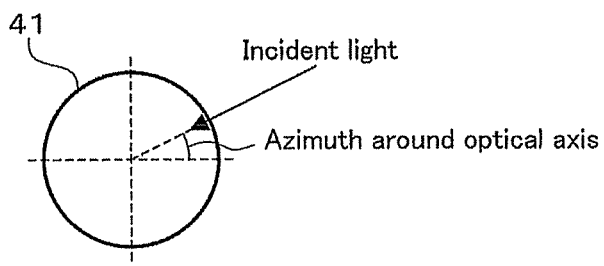
FIG. 14B is a diagram illustrating an example of a relationship between incident light and a lens when an image plane is viewed from above.
Figure 14C:
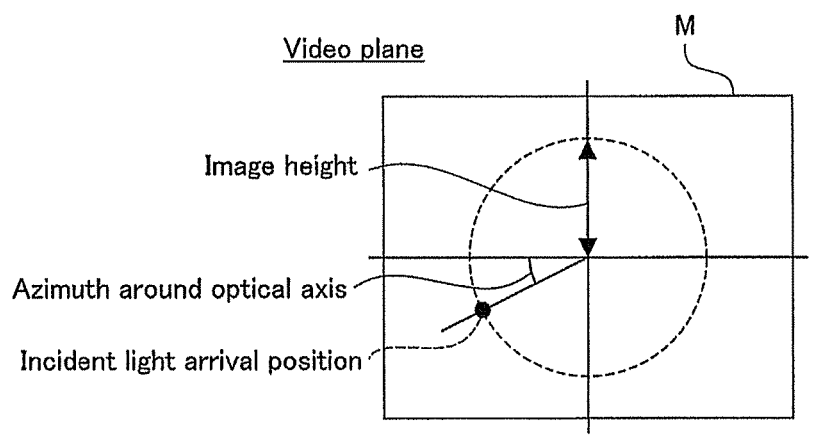
FIG. 14C is a diagram in which a broken line illustrates positions on an image plane at which incident light having the same angle of incidence can arrive.
Figure 14D:
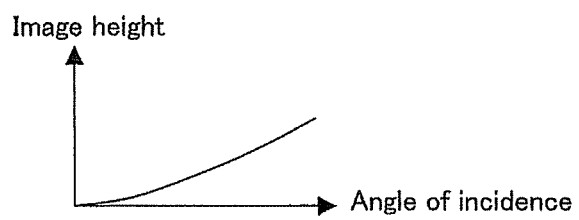
FIG. 14D is a diagram illustrating an example of a distortion characteristic of a wide-angle lens video as illustrated by a relationship between angle of incidence of light and image height.

The correspondence relationship between such points on the video plane and direction vectors can be obtained from the distortion characteristics of the wide-angle lens video. As one example, the video distortion characteristics can be expressed by data expressing the relationship between the angle of incidence of light beams and image height. FIG. 14A is a diagram illustrating a relationship between incident light on a plane perpendicular to the video plane M, the wide-angle lens 41, and image height. As illustrated in FIG. 14A, the angle of incidence is an angle formed by the incident light and the optical axis (central axis) of the lens, and the image height is a distance between an image center and a position arrived at on the video plane M by the incident light. FIG. 14B is a diagram illustrating a relationship between incident light and the lens 41 when the video plane is viewed from above. FIG. 14C is a diagram in which a broken line denotes positions on a video plane at which incident light beams having the same angle of incidence can arrive. FIG. 14D illustrates an example of the distortion characteristics of a wide-angle lens video expressed by the relationship between the angle of incidence of light and image height.

With lenses, since incident light beams having the same angle of incidence arrive at positions the same distance from the image center (see FIG. 14C), the distortion characteristics can be expressed by the relationship between the angle of incidence of light beams and image height. Directions around the optical axis are maintained on the video plane as well (see FIGS. 14B and 14C). If the inverse of the relationship between incident light and points on the video plane is used, the vector of incident light corresponding to a point on the video plane can be obtained, and the direction vector is the inverse of the incident light vector. This calculation is performed by the lens projection/conversion unit 19, and a direction vector from a position on the video plane is obtained for each node in the two-dimensional mesh, and assigned to the corresponding node.

A curve expressing the video distortion characteristics may be defined by a mathematical expression, or may be calculated by interpolating a value pair including an angle of incidence and an image height based on enumerated data. If this curved line is a straight line that passes through the origin, this in particular is called an equidistant projection, and this expresses an ideal fisheye lens.

Next is a more specific description of processing performed by the direction vector attachment unit 39 for assigning direction vectors to a two-dimensional mesh. Assume the example in which the two-dimensional mesh is an orthogonal grid in which the screen is divided horizontally into N partitions and vertically into M partitions. In this case, the generated result is obtained as data expressing, for example, two-dimensional array "vertex" whose size is (N+1)×(M+1) and that stores the screen coordinates of nodes, and two-dimensional array "direction" whose size is (N+1)×(M+1) and that stores direction vectors. The screen coordinate system is set such that the center is the origin, the screen horizontal direction (x coordinate) is from −1.0 to 1.0, and the vertical direction (y coordinate) is also from −1.0 to 1.0. At this time, the width $d_x$ and the height $d_y$ of a single grid is as described below.

$$d_x = 2.0/N$$

$$d_y = 2.0/M$$

Here, the vector value of each of the array "vertex" and array "direction" elements is calculated by executing procedure 1 described below.

Procedure 1

Vertical direction repetition (hereinafter, repeat while the integer m is incremented by 1 from 0 to M){

Horizontal direction repetition (hereinafter, repeat while the integer n is incremented by 1 from 0 to N){

Screen coordinate vertex[n][m]=(n$d_x$−1.0, m$d_y$−1.0)

Direction vector direction[n][m]=lens projection/conversion (vertex[n] [m]) }}

In lens projection/conversion ( ) in procedure 1 described above, a direction vector is calculated based on screen coordinates using the procedure described below. The screen coordinates are assumed to be $(v_x, v_y)$=vertex[n][m], the obtained direction vector is assumed to be $(u_x, u_y, u_z)$=direction[n][m], the size of the image sensor of the wide-angle camera to be simulated is assumed to be a horizontal width SW and a vertical width SH, and coordinates on the image sensor are assumed to be $(s_x, s_y)$.

At this time, first, coordinates on the image sensor are obtained as described below.

$$s_x = v_x SW/2.0$$

$$s_y = v_y SH/2.0$$

Next, based on these coordinates, the incident light azimuth α and image height h are obtained through, for example, expressions (1) and (2) described below.

$$\alpha = \tan^{-1} \frac{s_y}{s_x} \quad (1)$$

$$h = \sqrt{s_x^2 + s_y^2} \quad (2)$$

Furthermore, an angle of incidence θ of incident light from an image height is obtained using the video distortion characteristics. Assuming that the distortion characteristic is equidistant projection, the angle of incidence can be calculated by, for example, θ=hC. Here, C is a constant expressing a degree of distortion, and C is set in advance in accordance with a property that is to be simulated.

Figure 15:
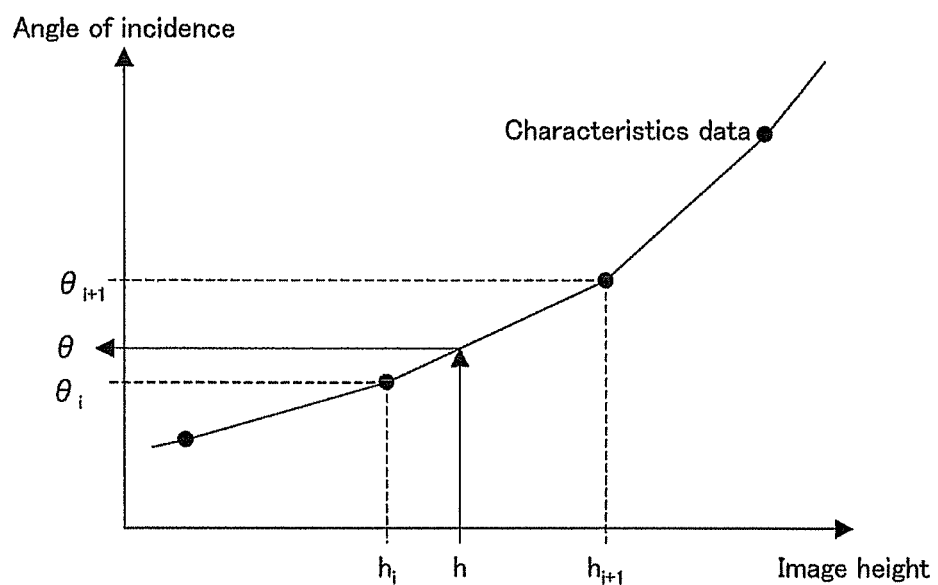
FIG. 15 is an example of a graph that plots groups of value pairs including an image height and an angle of incidence.

If the distortion characteristic is determined by characteristic data composed of a group of value pairs including an image height and an angle of incidence, an angle of incidence can be calculated by linear interpolation as described below. FIG. 15 is an example of a graph plotting a group of value pairs including an image height and an angle of incidence. Assuming that value pairs including an image height and an angle of incidence included in the characteristics data is $(h_i, \theta_i)$ (i being from 0 to the number of pairs minus 1, and $h_i$ being aligned in ascending order), the image height h obtained as described above is in the relationship $h_i \leq h < h_{i+1}$ at a certain i. At this time, the angle of incidence θ corresponding to h can be obtained by, for example, expression (3) described below.

$$\theta = (\theta_{i+1} - \theta_i) \frac{h - h_i}{h_{i+1} - h_i} + \theta_i \quad (3)$$

A more accurate interpolation may be performed by, in place of linear interpolation, using a second-order or higher function or exponential function, a Bézier curve, or the like.

When the azimuth α and the angle of incidence θ of the incident light have been obtained, it is then possible to obtain a direction vector using, for example, expressions (4) to (6) described below.

$$u_x = \cos \alpha \quad (4)$$

$$u_y = -\sqrt{1-u_x^2} \cos \theta \quad (5)$$

$$u_z = \sqrt{1-u_x^2} \sin \theta \quad (6)$$

Note that although an example of calculating a direction vector with use of the distortion characteristics of a wide-angle lens video as lens characteristics is described above, the calculation of a direction vector using lens characteristics is not limited to this example. For example, even if other parameters (e.g., a focal length, an angle of view, or an angle of coverage) are used as the lens characteristics, it is possible to calculate data expressing an association between the position of each node of a mesh in an output screen and positions in intermediate images. Also, although the mesh of the output image is a two-dimensional mesh in the example described above, the mesh of the output image may be a three-dimensional mesh.

Effects of the Present Embodiment

Figure 16A:
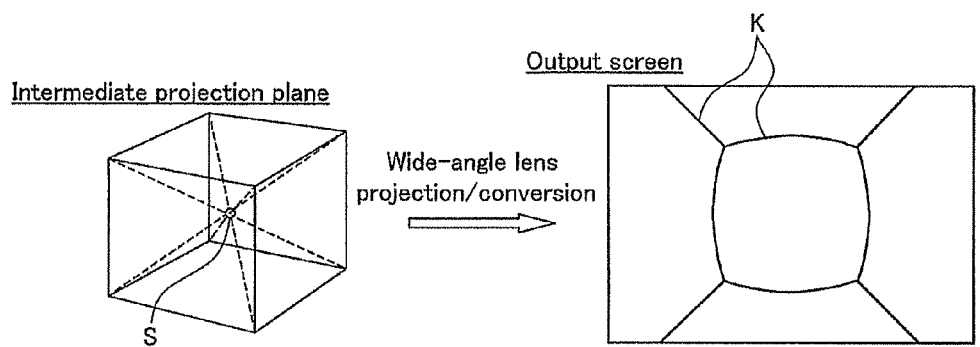
FIG. 16A is a diagram illustrating an example of intermediate projection planes and an output image obtained by performing projection and conversion on the intermediate projection planes.
Figure 16B:
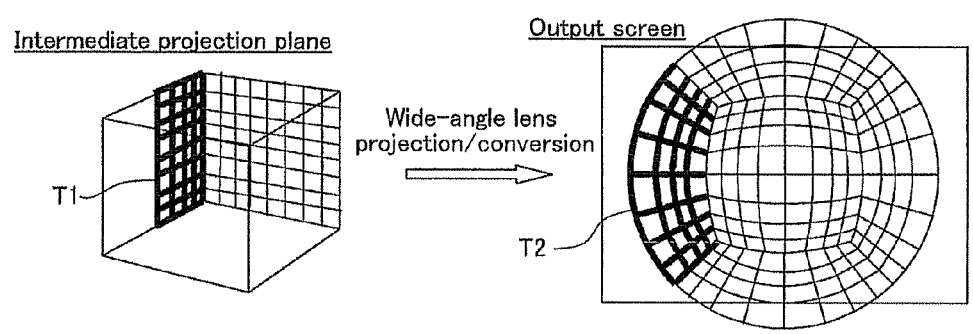
FIG. 16B is a diagram illustrating an example of a mesh of the intermediate projection planes and a mesh of the output image obtained by performing projection and conversion on the intermediate projection planes.

Conventionally, in the case of using texture mapping, the sides of a two-dimensional mesh on which intermediate images are to be pasted needed to be arranged in conformity with the boundary lines of intermediate projection planes. For example, as illustrated in FIG. 16A, in the case in which the intermediate projection planes are the planes of a cube whose center is the viewpoint position, in an output image obtained by performing wide-angle lens projection/conversion on intermediate images, the boundary of the boundary line in the intermediate images is a curve. For this reason, as illustrated in FIG. 16B, a two-dimensional mesh T2 of an output image obtained by performing projection/conversion on a mesh T1 of an intermediate projection plane needed to be set as a two-dimensional mesh whose curve conforms to a projection plane boundary K. The reason for this is that, since different portions of a polygon cannot be filled with different textures (intermediate images) in the case of using ordinary texture mapping, there has been a need to prevent the boundary of an intermediate projection plane from being inside polygons constituting the mesh. However, in order to generate such a two-dimensional mesh, there is a need to obtain a configuration on a screen by performing projection once through a wide-angle lens for intermediate projection planes in three-dimensions. Accordingly, there is a need to perform projection calculation for recreating the two-dimensional mesh each time the lens characteristics are updated, which results in a high calculation load.

In view of this, the wide-angle camera simulation unit 5a of the present embodiment employs the cube mapping function, and furthermore, for each node in a two-dimensional mesh, appropriately assigns direction vectors as an index for referencing pixels in a cube map image in the cube mapping function. Accordingly, there is not necessarily a need to arrange the sides of the two-dimensional mesh in conformity with the boundary lines of the intermediate projection planes. Also, it is possible to use, as the two-dimensional mesh, a configuration that can be generated on the output screen through simple processing (e.g., the triangular polygons illustrated in FIG. 12).

Embodiment 3

Figure 17:
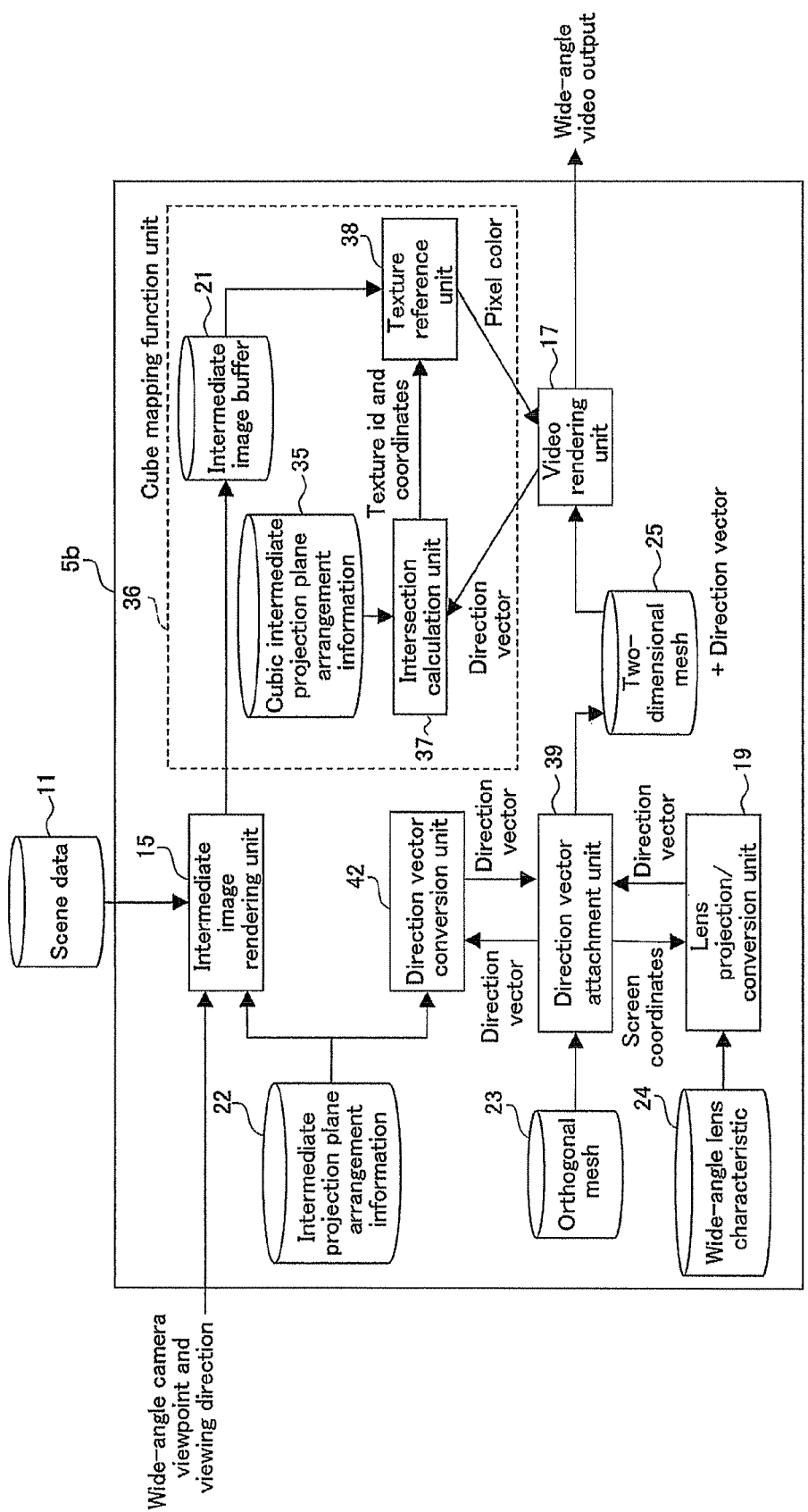
FIG. 17 is a functional block diagram illustrating an example of a configuration of a wide-angle camera simulation unit according to Embodiment 3.

Embodiment 3 is another exemplary variation of the wide-angle camera simulation unit. FIG. 17 is a functional block diagram illustrating a configuration of a wide-angle camera simulation unit 5b according to Embodiment 3. In FIG. 17, the same reference characters have been assigned to functional blocks that are the same as in FIG. 11.

In the present embodiment, each intermediate projection plane is defined by a perspective projection field of view setting similarly to camera projection planes used in the ordinary scene rendering unit 7, and the intermediate projection planes are arranged so that altogether they cover the entire field of view of the wide-angle camera. As one example, the following describes the case in which the planes of the cuboid illustrated in FIGS. 5A and 5B are each set as an intermediate projection plane. This is an example of a non-cubic projection plane arrangement. Arrangement information for the intermediate projection planes based on the viewpoint position and viewing direction of the wide-angle camera is recorded in advance in the intermediate projection plane arrangement information recording unit 22.

Figure 18A:
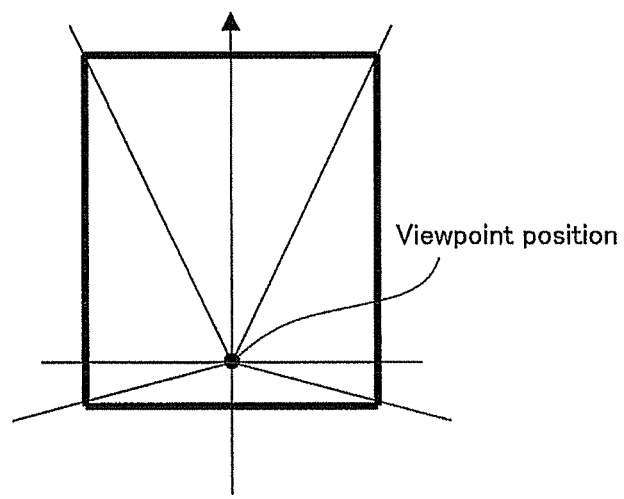
FIG. 18A is a plan view illustrating an example of a cuboid and a viewpoint position of a wide-angle camera as viewed from above.
Figure 18B:
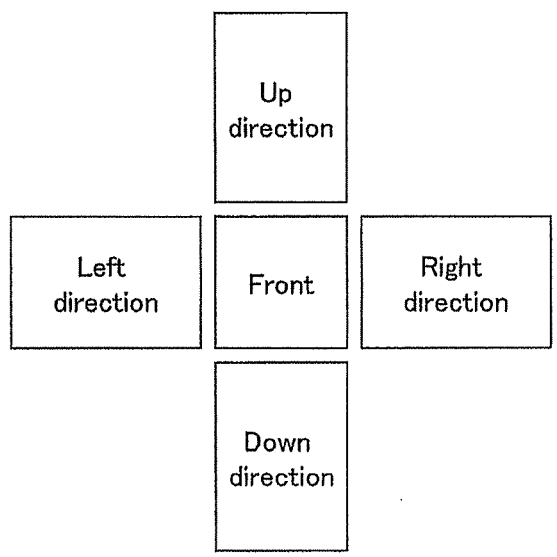
FIG. 18B is a development diagram illustrating an example of projection planes of the cuboid.
Figure 19A:
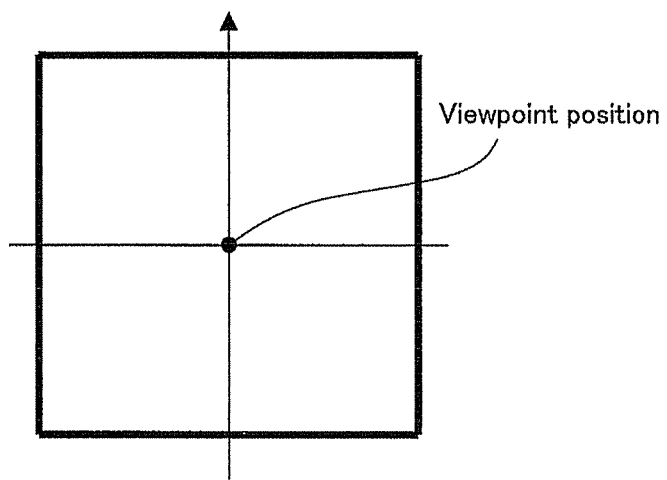
FIG. 19A is a plan view illustrating a cube and a viewpoint position of a wide-angle camera.
Figure 19B:
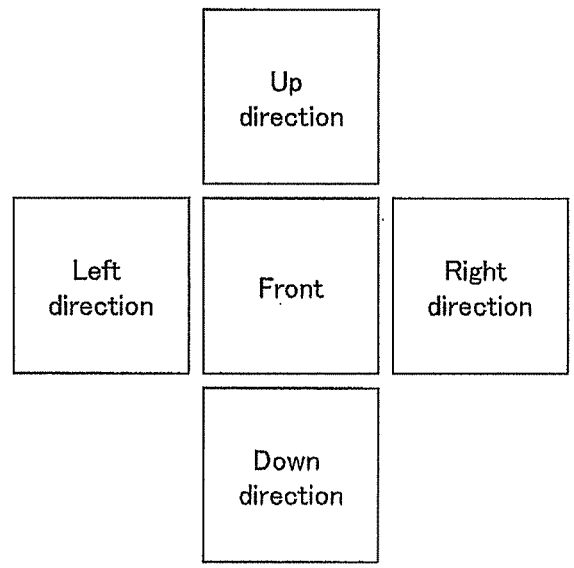
FIG. 19B is a development diagram illustrating projection planes of the cuboid.

FIG. 18A is a plan view illustrating the cuboid and the viewpoint position of the wide-angle camera as seen from above, and FIG. 18B is a development diagram illustrating projection planes of the cuboid. FIG. 19A is a plan view illustrating a cube and a viewpoint position of the wide-angle camera in the cubic projection plane arrangement of Embodiment 2, and FIG. 19B is a development diagram illustrating the projection planes of the cube. In the present embodiment, there are six intermediate projection planes, which is the same number of intermediate projection planes arranged in the cubic arrangement, and arrangement information for the projection planes is recorded in association with the projection planes used in the case of the cubic arrangement. For example, the top, bottom, front, right, and left projection planes in FIG. 18B are respectively recorded in association with the top, bottom, front, right, and left projection planes in FIG. 19B.

In this case where the intermediate projection planes are the planes of a cuboid in which the viewpoint of the wide-angle camera is included at an arbitrary position, the wide-angle camera simulation unit 5b generates video with use of the cube mapping function. For this reason, as illustrated in FIG. 17, the wide-angle camera simulation unit 5b furthermore includes a direction vector conversion unit 42.

First, the intermediate image rendering unit 15 performs perspective projection on intermediate projection planes arranged on the planes of the cuboid including the wide-angle camera viewpoint, and stores intermediate images in the intermediate image buffer 21. At this time, the intermediate image buffer 21 is a cube mapping texture memory. For this reason, the intermediate images that are stored are composed of N×N (N is a natural number) pixels.

Meanwhile, the direction vector attachment unit 39 generates direction vectors that correspond to vertexes in a two-dimensional mesh. The direction vector conversion unit 42 converts the direction vectors corresponding to the vertexes in the two-dimensional mesh based on the intermediate projection plane arrangement of the cuboid described above. A specific example of this conversion is described later. Thereafter, the video rendering unit 17 performs output image rendering with use of the cube mapping function unit 36. Accordingly, with the use of the cube mapping function, the same video is obtained as the case of performing video generation by a non-cubic intermediate projection plane arrangement. As a result, it is possible to effectively use a texture memory while using the cube mapping function.

Specific Example of Direction Vector Conversion

Figure 20A:
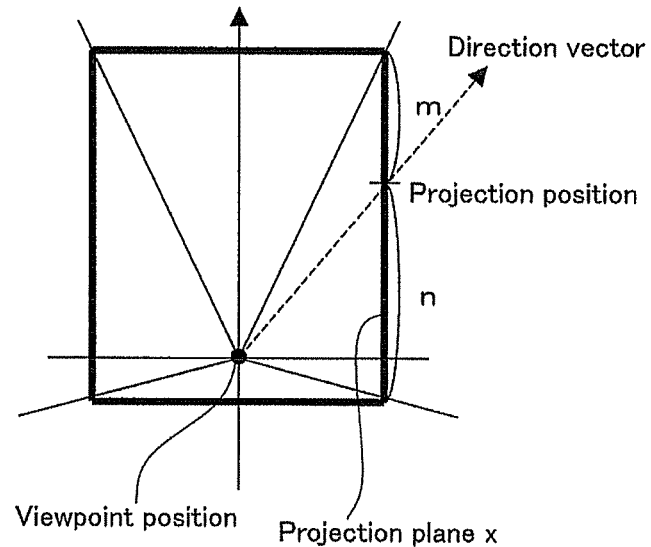
FIG. 20A is a plan view illustrating a cuboid and a viewpoint position of a wide-angle camera as viewed from above.
Figure 20B:
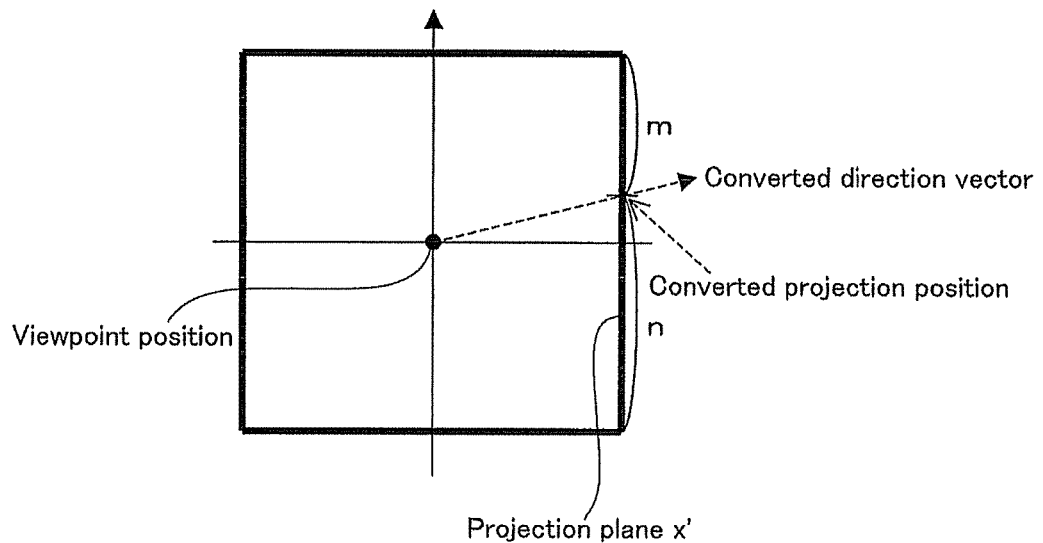
FIG. 20B is a plan view illustrating an example of a positional relationship between a cubic projection plane arrangement and a direction vector as viewed from above.

In order to realize a non-cubic intermediate projection plane arrangement, the direction vector conversion unit 42 performs direction vector conversion. FIG. 20A is a plan view illustrating the cuboid and the wide-angle camera viewpoint position in the non-cubic projection plane arrangement as seen from above, and an example of a direction vector whose origin is the viewpoint position. FIG. 20B is a plan view illustrating a positional relationship between the direction vector and the cubic projection plane arrangement processed in the cube mapping function unit 36 as seen from above.

As one example, in the cases of the arrangements illustrated in FIGS. 20A and 20B, calculation for converting the direction vectors is performed as described below. First, in the actual (non-cubic) projection plane arrangement, the projection plane with which the direction vector intersects (projection plane X), and a projection position on the projection plane X (a ratio of m to n with respect to the width of the projection plane) are obtained. Next, in the cube map projection plane corresponding to the projection plane X (projection plane X'), a converted projection position is obtained using the ratio of m to n. Furthermore, a converted direction vector is obtained by calculating a vector from the viewpoint position to the converted projection position. Note that the method of direction vector conversion is not limited to this example.

Specific Example of Wide-Angle Camera Video Generation

At the time of scene rendering, the wide-angle camera simulation unit 5b generates wide-angle camera video through the process described below.

First, when the viewpoint and viewing direction of the wide-angle camera have been updated due to scene updating, the wide-angle camera simulation unit 5b calculates the positions and orientations of intermediate projection planes based on the intermediate projection plane arrangement information. Thereafter, the intermediate image rendering unit 15 renders multiple intermediate images by performing perspective projection with respect to the intermediate projection planes, and stores the intermediate images in the intermediate image buffer 21. At this time, although the configuration is a square since the intermediate image buffer 21 is a cube map image buffer, the angle of view of the intermediate projection planes is not limited to being the same vertically and horizontally, and the intermediate images are stored in a cube mapping buffer that can accommodate the number of pixels according to the square size.

Figure 21:
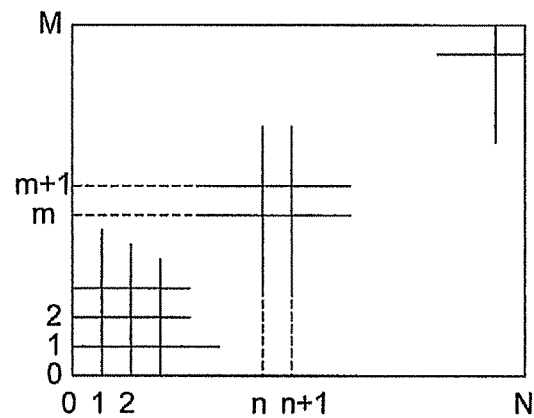
FIG. 21 is a diagram illustrating an example of an orthogonal grid including N partitions horizontally and M partitions vertically in an output image.
Figure 22:
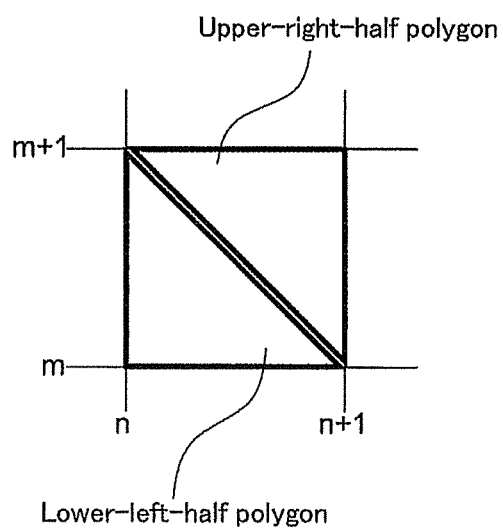
FIG. 22 is a diagram illustrating an example of polygons included in an orthogonal grid.

Next, the video rendering unit 17 performs two-dimensional mesh rendering. Specifically, while performing cube mapping with use of the cube map images in the intermediate image buffer 21, the video rendering unit 17 renders polygons constituting the two-dimensional mesh one-by-one. The cube map images are referenced and pasted to the polygons in accordance with the direction vectors assigned to the polygons, and as a result, the entire two-dimensional mesh is rendered as a wide-angle camera video generated by deforming and compositing a group of intermediate images. If the two-dimensional mesh is an orthogonal grid divided horizontally into N partitions and vertically into M partitions as described above, the output image rendering processing is performed by the procedure 2 described below. Note that FIG. 21 is a diagram illustrating an orthogonal grid divided horizontally into N partitions and vertically into M partitions in an output image. FIG. 22 is a diagram illustrating an example of polygons included in the orthogonal grid.

Procedure 2

Vertical direction repetition (hereinafter, repeat while the integer m is incremented by 1 from 0 to M){

Horizontal direction repetition (hereinafter, repeat while the integer n is incremented by 1 from 0 to N){

Render lower-left-half triangular polygon in grid

{vertex 1} coordinate vertex[n] [m], direction vector direction[n] [m]

{vertex 2} coordinate vertex[n+1][m], direction vector direction[n+1] [m]

{vertex 3} coordinate vertex[n][m+1], direction vector direction[n][m+1]

Render upper-right-half triangular polygon in grid
{vertex 1} coordinate vertex[n+1] [m], direction vector direction[n+1][m]
{vertex 2} coordinate vertex[n+1][m+1], direction vector direction[n+1] [m+1]
{vertex 3} coordinate vertex[n][m+1], direction vector direction[n][m+1] }}

As set forth above, according to the present embodiment, even in the case of using the cube mapping function, the intermediate projection planes are not limited to a cubic arrangement. Conventionally, intermediate projection planes have been limited to a cubic arrangement when using the cube mapping function. There are cases in which wide-angle lenses have a wide field of view angle that somewhat exceeds 180 degrees, and therefore only a little more than half of the top, bottom, left, and right planes can be used in the case of a cubic configuration, and the usage efficiency of the texture memory degrades. Also, since the resolution of the intermediate images is assigned evenly to the front plane and the back plane, the resolution is readily insufficient in particularly the vicinity of the image center that is extended with wide-angle lenses. According to the present embodiment, it is possible to arrange the viewpoint position and execute cube mapping so that the field of view angle of the wide-angle lens substantially covers five planes of a cuboid. The usage efficiency of the texture memory is therefore improved. This also prevents a reduction in the resolution in the vicinity of the image center.

Embodiment 4

The present embodiment relates to a method for setting the intermediate projection planes. In Embodiment 3 described above, due to a side-effect of the direction vector conversion, it is possible for texture distortion to somewhat stand out in mainly the vicinity of boundaries of the intermediate projection planes. By using the intermediate projection planes of the present embodiment, it is possible to suppress texture distortion in the vicinity of the boundaries of the intermediate projection planes.

Figure 23:
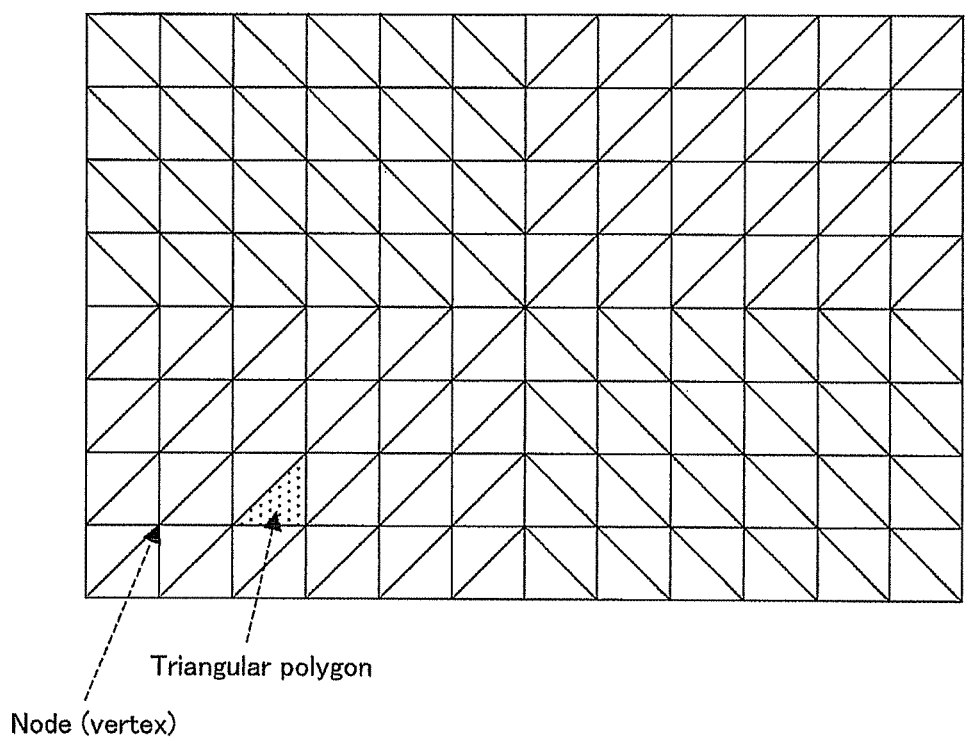
FIG. 23 is a diagram illustrating an example of a two-dimensional mesh according to Embodiment 4.

When the top, bottom, left, and right intermediate projection planes are set so as to have the same configuration, the boundaries between the top, bottom, left, and right intermediate projection planes become straight lines that extend from the center in a 45-degree diagonal direction in the final video. In view of this, the two-dimensional mesh is created using a square grid, and furthermore the partition lines of each grid are caused to extend from the center of the video to the periphery. FIG. 23 is a diagram illustrating an example of such a two-dimensional mesh. In this way, since a portion of the boundary lines of the intermediate projection planes conform to the partition lines of the mesh, the problem of distortion due to the side-effect of the direction vector conversion with respect to such partition lines does not readily occur. Furthermore, there is almost no cost increase in processing.

Embodiment 5

Figure 24:
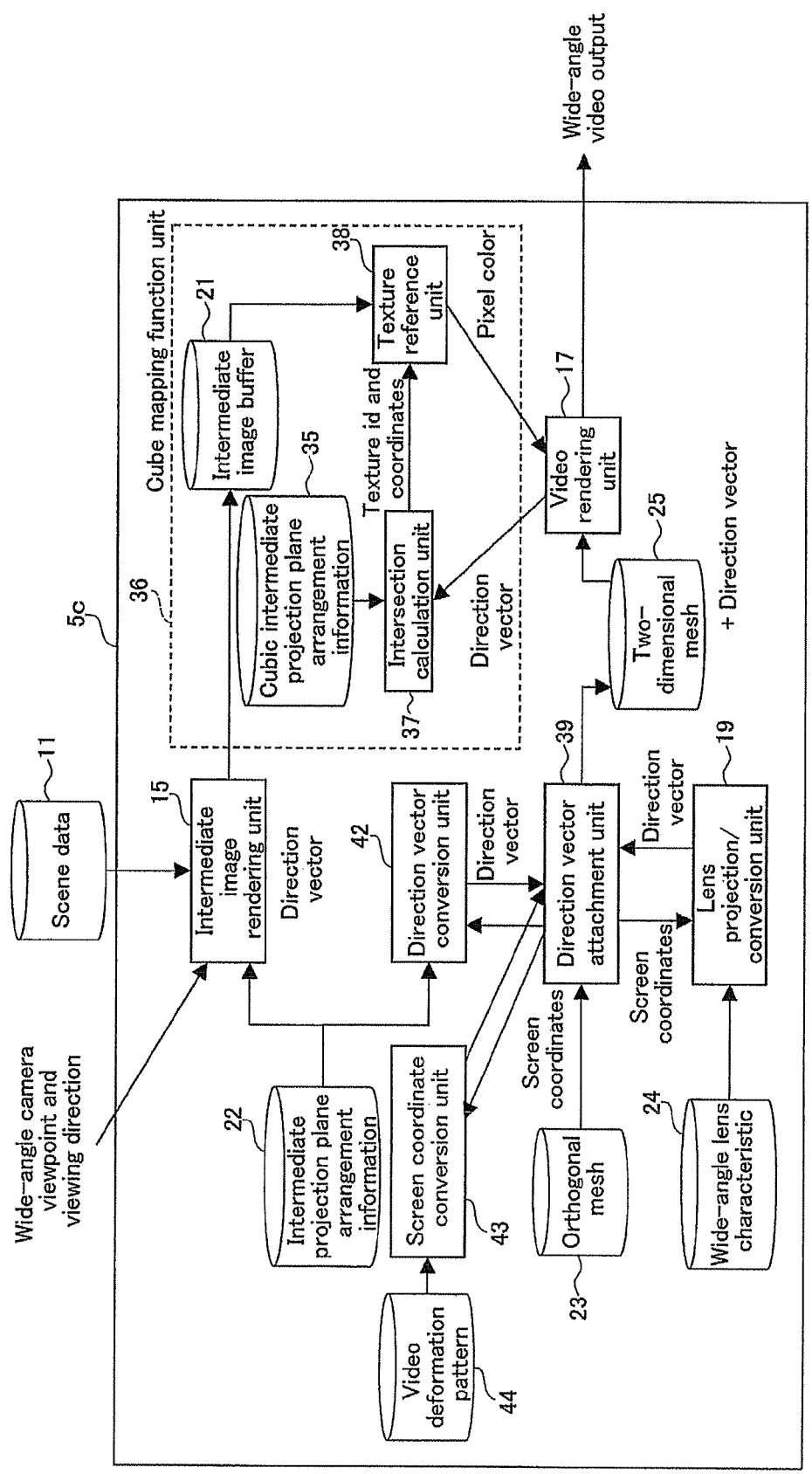
FIG. 24 is a functional block diagram illustrating an example of a configuration of a wide-angle camera simulation unit according to Embodiment 5.

FIG. 24 is a functional block diagram illustrating a configuration of a wide-angle camera simulation unit 5c according to Embodiment 5. In FIG. 24, the same reference characters have been assigned to functional blocks that are the same as in FIG. 17. A screen coordinate conversion unit 43 and a video deformation pattern recording unit 44 have been added to the wide-angle camera simulation unit 5b illustrated in FIG. 17.

The video deformation pattern recording unit 44 has recorded therein data defining a video deformation pattern used by, for example, the DSP included in the wide-angle camera. The screen coordinate conversion unit 43 converts screen coordinates in accordance with the video deformation pattern that is to be simulated. After the screen coordinate conversion unit 43 has converted the screen coordinates of the nodes in the two-dimensional mesh, the direction vector attachment unit 39 causes the lens projection/conversion unit 19 to calculate direction vectors. Note that similarly to direction vector conversion, it is sufficient for the screen coordinate conversion performed by the screen coordinate conversion unit 43 to be performed only at the time of initialization. The processing performed by the video rendering unit 17 may be the same as in Embodiment 3 described above. The following describes a concrete example.

Simulation of Video Deformation by a DSP

For example, in the case of simulating video deformation processing by the DSP included in the wide-angle camera, the screen coordinate conversion unit 43 is furthermore added. Due to the video deformation performed by the DSP, for example, part of a fisheye lens image is cut out and distortion is removed.

Figure 25:
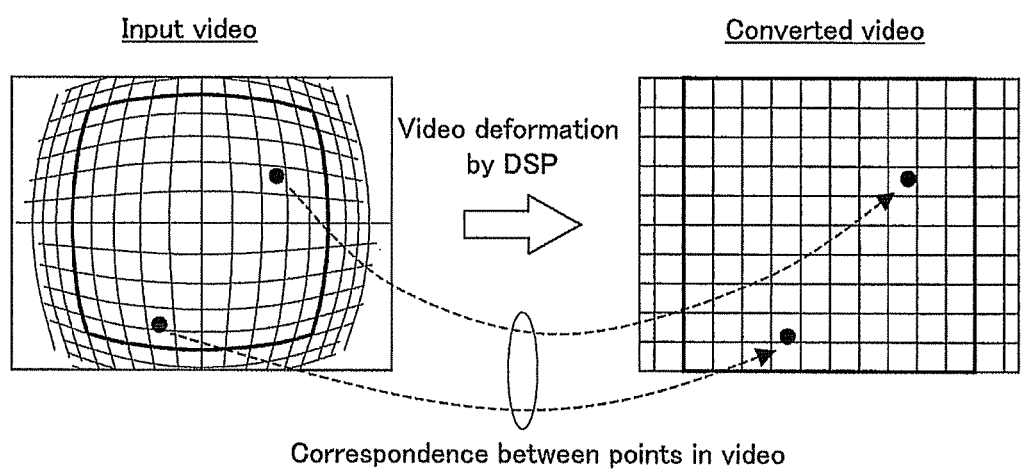
FIG. 25 diagrammatically illustrates an example of video deformation by an internal DSP of a camera.

FIG. 25 diagrammatically illustrates an example of video deformation by the internal DSP of the camera. At this time, points on an input image are in one-to-one correspondence with points on a converted image. In order to simulate this, the direction vector attachment unit 39 performs, for example, processing such as the following.

Figure 26:
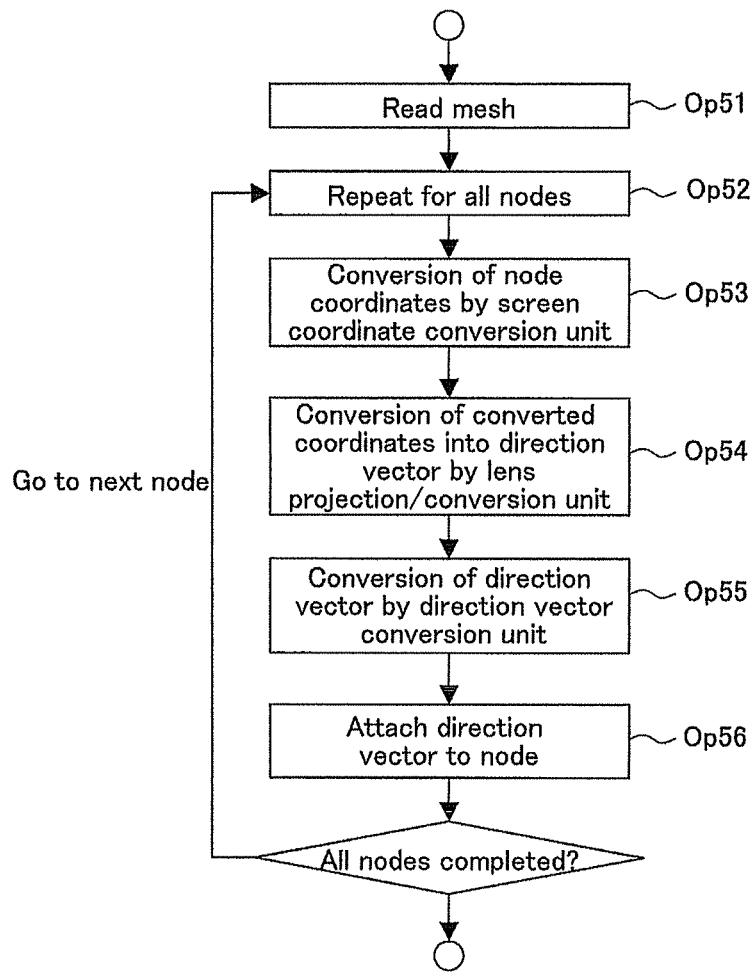
FIG. 26 is an operation chart illustrating an example of operations performed by a direction vector attachment unit in a case of video deformation.
Figure 27:
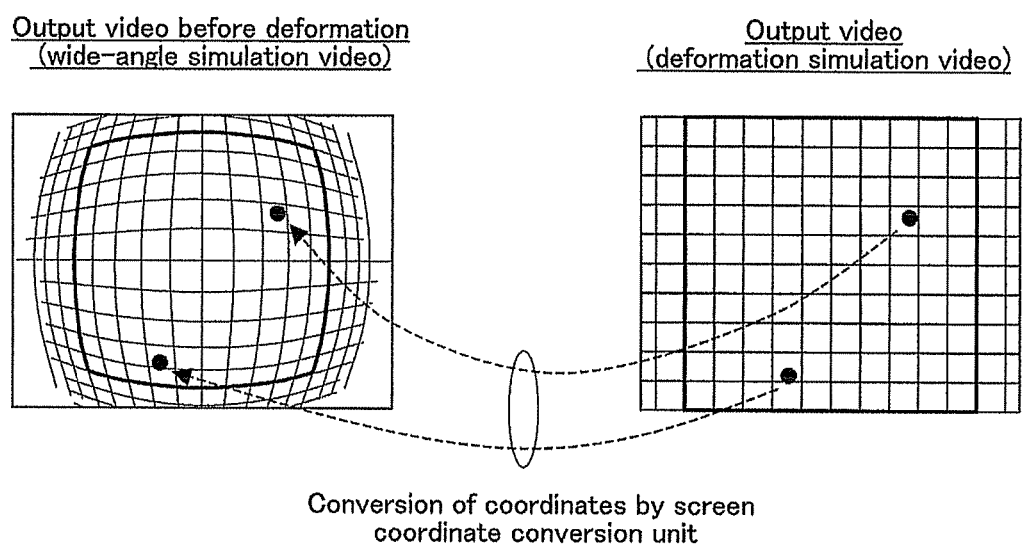
FIG. 27 diagrammatically illustrates an example of conversion performed by a screen coordinate conversion unit 43.

FIG. 26 is an operation chart illustrating an example of operations performed by the direction vector attachment unit 39 at the time of video deformation. First, the screen coordinate conversion unit 43 converts the coordinates of nodes in the mesh read in Op51 (Op53). The screen coordinate conversion unit 43 traces back the correspondence relationship of the screen coordinates through the video deformation, and based on coordinates on the screen after video deformation (output video), obtains coordinates on the screen before video deformation. FIG. 27 diagrammatically illustrates an example of conversion performed by the screen coordinate conversion unit 43. Next, the lens projection/conversion unit 19 obtains direction vectors from the converted screen coordinates (Op54). Thereafter, in the case of using the direction vector conversion unit 42, the direction vector conversion unit 42 converts direction vectors (Op55). The obtained direction vectors are attached to the nodes of the mesh and recorded in the two-dimensional mesh recording unit 25 (Op56). After the video rendering unit 17 has rendered the mesh with the direction vectors attached thereto in this way, the simulated wide-angle camera video is further deformed by the DSP, and the resulting video is rendered.

Recent years have seen the appearance of on-vehicle cameras that include a DSP and internally perform video deformation processing such as eliminating video distortion and perspective conversion. According to the present embodiment, such a on-vehicle camera can also be simulated by a driving simulator.

Effects, etc.

Verification in a virtual environment on a computing device is effective in developing applications that use a on-vehicle camera such as a driving view assistance system. The driving simulators according to Embodiments 1 to 5 described above enable real-time simulation of video from a on-vehicle wide-angle camera in such a virtual environment. As a result, it is possible to connect an actual on-vehicle device that executes a on-vehicle camera application to a simulator and perform various types of verification. It costs very much to performing verification using a actual vehicle with creating various conditions related to the camera type, installation location, surrounding environment, traffic status, and the like, and repeatedly performing experiments while changing the conditions. However, the above-mentioned driving simulators can cut back such cost. Furthermore, dangerous verification that can lead to accidents cannot be performed with actual vehicles, but such verification is possible if the driving simulators of the above embodiments are used.

The wide-angle camera simulation unit according to the present invention can be used in applications other than a driving simulator. For example, the functions of the wide-angle camera simulation unit according to the present invention can also be used in, for example, a driving game or a simulation system for performing experimentation or verification of events in a three-dimensional world modeled on a computing device system.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A driving simulation apparatus comprising:
   a processor; and
   a memory which stores a plurality of instructions, which when executed by the processor, cause the processor to execute;
   an input instruction that receives an input of an operation instruction with respect to a vehicle in a virtual environment;
   a vehicle simulation instruction that calculates a position and an orientation of the vehicle in the virtual environment in real-time in accordance with the input of the operation instruction;
   a camera state calculation instruction that obtains a viewpoint position and a viewing direction of a on-vehicle wide-angle camera based on the position and the orientation of the vehicle; and
   a wide-angle camera simulation instruction including;
      an intermediate image rendering instruction that generates a plurality of intermediate images by, for a plurality of intermediate projection planes that cover a given field of view from the on-vehicle wide-angle camera, performing perspective projection on the virtual environment from both the viewpoint position and the viewing direction of the on-vehicle wide-angle camera that are calculated by the camera state calculation unit; and
      a video rendering instruction that generates a on-vehicle wide-angle camera video by deforming and compositing the plurality of intermediate images,
   wherein the intermediate image rendering instruction generates the plurality of intermediate images by performing perspective projection on the virtual environment from the viewpoint position and the viewing direction of the on-vehicle wide-angle camera, with use of, as the plurality of intermediate projection planes, at least two planes among six planes of a cube in which the viewpoint of the on-vehicle camera is included, the driving simulation apparatus further comprises a direction vector attachment instruction that, for each node of a two-dimensional mesh arranged on a screen of the on-vehicle wide-angle camera video to be generated, calculates a direction vector that associates the node and a position on an intermediate projection plane from among the plurality of intermediate projection planes, based on the parameter obtained based on a relationship between a direction of an incident light that incidents the lens of the on-vehicle wide-angle camera and a two-dimensional position of an image that is formed by the incident light which transmits through the lens on a capturing plane of the on-vehicle wide-angle camera, wherein the video rendering instruction generates the on-vehicle wide-angle camera video by mapping textures of the plurality of intermediate images to the two-dimensional mesh with use of the direction vectors.

2. The driving simulation apparatus according to claim 1, wherein a cube mapping function is used as processing in which the textures of the plurality of intermediate images are mapped to the two-dimensional mesh with use of the direction vectors.

3. The driving simulation apparatus according to claim 1, wherein partition lines of the two-dimensional mesh arranged on the screen of the on-vehicle wide-angle camera video to be generated have been set so as to overlap with, among boundary lines of the plurality of intermediate projection planes, boundary lines that are to be straight lines on the screen of the on-vehicle wide-angle camera video to be generated.

4. A driving simulation apparatus comprising:
   a processor; and
   a memory which stores a plurality of instructions, which when executed by the processor, cause the processor to execute;
   an input instruction that receives an input of an operation instruction with respect to a vehicle in a virtual environment;
   a vehicle simulation instruction that calculates a position and an orientation of the vehicle in the virtual environment in real-time in accordance with the input of the operation instruction;
   a camera state calculation instruction that obtains a viewpoint position and a viewing direction of a on-vehicle wide-angle camera based on the position and the orientation of the vehicle; and
   a wide-angle camera simulation instruction including;
      an intermediate image rendering instruction that generates a plurality of intermediate images by, for a plurality of intermediate projection planes that cover a given field of view from the on-vehicle wide-angle camera, performing perspective projection on the virtual environment from both the viewpoint position and the viewing direction of the on-vehicle wide-angle camera that are calculated by the camera state calculation unit; and
      a video rendering instruction that generates a on-vehicle wide-angle camera video by deforming and compositing the plurality of intermediate images, wherein the intermediate image rendering unit generates the plurality of intermediate images by performing perspective projection on the virtual environment from the viewpoint position and the viewing direction of the on-vehicle wide-angle camera, with use of, as the plurality of intermediate projection planes, at least two planes among six planes of a cuboid in which the viewpoint of the on-vehicle camera is included, the driving simulation apparatus further comprises
a direction vector attachment instruction that, for each node of a two-dimensional mesh arranged on a screen of the on-vehicle wide-angle camera video, calculates a direction vector that associates the node and a position on an intermediate projection plane from among the plurality of intermediate projection planes, based on the parameter obtained based on a relationship between a direction of an incident light that incidents the lens of the on-vehicle wide-angle camera and a two-dimensional position of an image that is formed by the incident light which transmits through the lens on a capturing plane of the on-vehicle wide-angle camera, and a vector conversion instruction that, based on a positional relationship between the cuboid and the viewpoint of the on-vehicle wide-angle camera, converts the direction vectors calculated by the direction vector attachment unit into vectors that, for each node of the two-dimensional mesh, associate the node and a position on a plane of a post-deformation cube obtained when the cuboid is deformed into a cube whose center is the camera viewpoint, wherein the video rendering instruction generates the on-vehicle wide-angle camera video by mapping textures of the plurality of intermediate images to the two-dimensional mesh with use of the direction vectors.

5. The driving simulation apparatus according to claim 4, wherein a cube mapping function is used as processing in which the textures of the plurality of intermediate images are mapped to the two-dimensional mesh with use of the direction vectors.

6. The driving simulation apparatus according to claim 4, wherein partition lines of the two-dimensional mesh arranged on the screen of the on-vehicle wide-angle camera video to be generated have been set so as to overlap with, among boundary lines of the plurality of intermediate projection planes, boundary lines that are to be straight lines on the screen of the on-vehicle wide-angle camera video to be generated.

7. A driving simulation method, comprising:

a method performed by a processor and a memory which stores a plurality of instructions, which when performed by the processor, cause the processor to perform;

an input instruction that receives an input of an operation instruction with respect to a vehicle in a virtual environment;

a vehicle simulation instruction that calculates a position and an orientation of the vehicle in the virtual environment in real-time in accordance with the input of the operation instruction;

a camera state calculation instruction that obtains a viewpoint position and a viewing direction of a on-vehicle wide-angle camera based on the position and the orientation of the vehicle; and a wide-angle camera simulation instruction including;

an intermediate image rendering instruction that generates a plurality of intermediate images by, for a plurality of intermediate projection planes that cover a given field of view from the on-vehicle wide-angle camera, performing perspective projection on the virtual environment from both the viewpoint position and the viewing direction of the on-vehicle wide-angle camera that are calculated by the camera state calculation unit; and a video rendering instruction that generates a on-vehicle wide-angle camera video by deforming and compositing the plurality of intermediate images, wherein the intermediate image rendering instruction generates the plurality of intermediate images by performing perspective projection on the virtual environment from the viewpoint position and the viewing direction of the on-vehicle wide-angle camera, with use of, as the plurality of intermediate projection planes, at least two planes among six planes of a cube in which the viewpoint of the on-vehicle camera is included, the driving simulation apparatus further comprises a direction vector attachment instruction that, for each node of a two-dimensional mesh arranged on a screen of the on-vehicle wide-angle camera video to be generated, calculates a direction vector that associates the node and a position on an intermediate projection plane from among the plurality of intermediate projection planes, based on the parameter obtained based on a relationship between a direction of an incident light that incidents the lens of the on-vehicle wide-angle camera and a two-dimensional position of an image that is formed by the incident light which transmits through the lens on a capturing plane of the on-vehicle wide-angle camera, wherein the video rendering instruction generates the on-vehicle wide-angle camera video by mapping textures of the plurality of intermediate images to the two-dimensional mesh with use of the direction vectors.

8. A non-transitory computer readable storage storing a driving simulation method, the a method performed by a processor and a memory which stores a plurality of instructions, which when performed by the processor, cause the processor to perform;

an input instruction that receives an input of an operation instruction with respect to a vehicle in a virtual environment;

a vehicle simulation instruction that calculates a position and an orientation of the vehicle in the virtual environment in real-time in accordance with the input of the operation instruction;

a camera state calculation instruction that obtains a viewpoint position and a viewing direction of a on-vehicle wide-angle camera based on the position and the orientation of the vehicle; and a wide-angle camera simulation instruction including;

an intermediate image rendering instruction that generates a plurality of intermediate images by, for a plurality of intermediate projection planes that cover a given field of view from the on-vehicle wide-angle camera, performing perspective projection on the virtual environment from both the viewpoint position and the viewing direction of the on-vehicle wide-angle camera that are calculated by the camera state calculation unit; and a video rendering instruction that generates a on-vehicle wide-angle camera video by deforming and compositing the plurality of intermediate images, wherein the intermediate image rendering instruction generates the plurality of intermediate images by performing perspective projection on the virtual environment from the viewpoint position and the viewing direction of the on-vehicle wide-angle camera, with use of, as the plurality of intermediate projection planes, at least two planes among six planes of a cube in which the viewpoint of the on-vehicle camera is included, the driving simulation apparatus further comprises a direction vector attachment instruction that, for each node of a two-dimensional mesh arranged on a screen of the on-vehicle wide-angle camera video to be generated, calculates a direction vector that associates the node and a position on an intermediate projection plane from among the plurality of intermediate projection planes, based on the parameter obtained based on a relationship between a direction of an incident light that incidents the lens of the on-vehicle wide-angle camera and a two-dimensional position of an image that is formed by the incident light which transmits through the lens on a capturing plane of the on-vehicle wide-angle camera, wherein the video rendering instruction generates the on-vehicle wide-angle camera video by mapping textures of the plurality of intermediate images to the two-dimensional mesh with use of the direction vectors.

* * * * *

UNITED STATES PATENT AND TRADEMARK OFFICE
CERTIFICATE OF CORRECTION

| | | |
|---|---|---|
| PATENT NO. | : 8,907,950 B2 | Page 1 of 1 |
| APPLICATION NO. | : 12/568841 | |
| DATED | : December 9, 2014 | |
| INVENTOR(S) | : Ryosuke Miyata | |

It is certified that error appears in the above-identified patent and that said Letters Patent is hereby corrected as shown below:

On the Title Page

Column 2, Item [74] (Attorney, Agent or Firm), Line 1, Delete "Staas & Hasley LLP" and insert -- Staas & Halsey LLP --, therefor.

In the Claims

Column 24, Line 30, In Claim 8, delete "the a method" and insert -- a method --, therefor.

Signed and Sealed this
Eighteenth Day of August, 2015

Michelle K. Lee
*Director of the United States Patent and Trademark Office*